United States Patent [19]

Suzuki et al.

[11] Patent Number: 5,414,862
[45] Date of Patent: May 9, 1995

[54] APPARATUS FOR CONTROLLING A POWER SOURCE

[75] Inventors: Koji Suzuki, Yokohama; Tadashi Ishikawa, Tokyo; Joji Nagahira; Hajime Motoyama, both of Yokohama, all of Japan

[73] Assignee: Canon Kabushiki Kaisha, Tokyo, Japan

[21] Appl. No.: 925,425

[22] Filed: Aug. 10, 1992

Related U.S. Application Data

[63] Continuation of Ser. No. 336,413, Apr. 10, 1989, abandoned.

[30] Foreign Application Priority Data

| Apr. 12, 1988 | [JP] | Japan | 63-88146 |
| May 27, 1988 | [JP] | Japan | 63-128515 |
| Jun. 17, 1988 | [JP] | Japan | 63-148307 |
| Jun. 17, 1988 | [JP] | Japan | 63-148309 |
| Jun. 23, 1988 | [JP] | Japan | 63-153542 |

[51] Int. Cl.⁶ ............................................. G06F 1/26
[52] U.S. Cl. ............................. 395/750; 364/273; 364/273.5; 364/DIG. 1; 364/948.4; 364/948.91; 364/DIG. 2
[58] Field of Search ............... 395/750; 364/707, 273, 364/273.5, DIG. 1, 948.4, 948.91, DIG. 2; 371/14, 66; 330/123, 127

[56] References Cited

U.S. PATENT DOCUMENTS

| 4,335,371 | 6/1982 | Connolly, Jr. et al. | 341/121 |
| 4,335,445 | 6/1982 | Nercessian | 395/750 |
| 4,387,399 | 6/1983 | Novotny | 358/190 |
| 4,413,212 | 11/1983 | Okamoto et al. | 318/317 |
| 4,441,061 | 4/1984 | Yoshida et al. | 318/329 |
| 4,580,222 | 4/1986 | Fujii | 364/431.11 |
| 4,727,382 | 2/1988 | Negishi et al. | 346/108 |
| 4,727,463 | 2/1988 | Suzuki | 363/21 |
| 4,766,567 | 8/1988 | Kato | 395/750 |
| 4,780,631 | 10/1988 | Gröninger | 310/71 |
| 4,841,207 | 6/1989 | Cheyne | 388/811 |
| 4,843,592 | 6/1989 | Tsuaki et al. | 395/750 |

FOREIGN PATENT DOCUMENTS

| 0071663 | 5/1983 | European Pat. Off. |
| 0104439 | 4/1984 | European Pat. Off. |
| 0196032 | 10/1986 | European Pat. Off. |
| 61-47971 | 3/1986 | Japan |
| 61-215562 | 9/1986 | Japan |

*Primary Examiner*—Jack B. Harvey
*Assistant Examiner*—Glenn A. Auve
*Attorney, Agent, or Firm*—Fitzpatrick, Cella, Harper & Scinto

[57] ABSTRACT

A controller including an analog circuit for controlling a power source of an apparatus and a digital circuit including a CPU for performing sequence control for the apparatus and for controlling the analog circuit. The analog circuit having a comparator for comparing an output of the power source with a reference signal to output a signal for controlling the power source. Both the analog circuit and the digital circuit are integrally formed on a chip.

18 Claims, 28 Drawing Sheets

SWITCH ON ----- H LEVEL
SWITCH OFF ----- L LEVEL

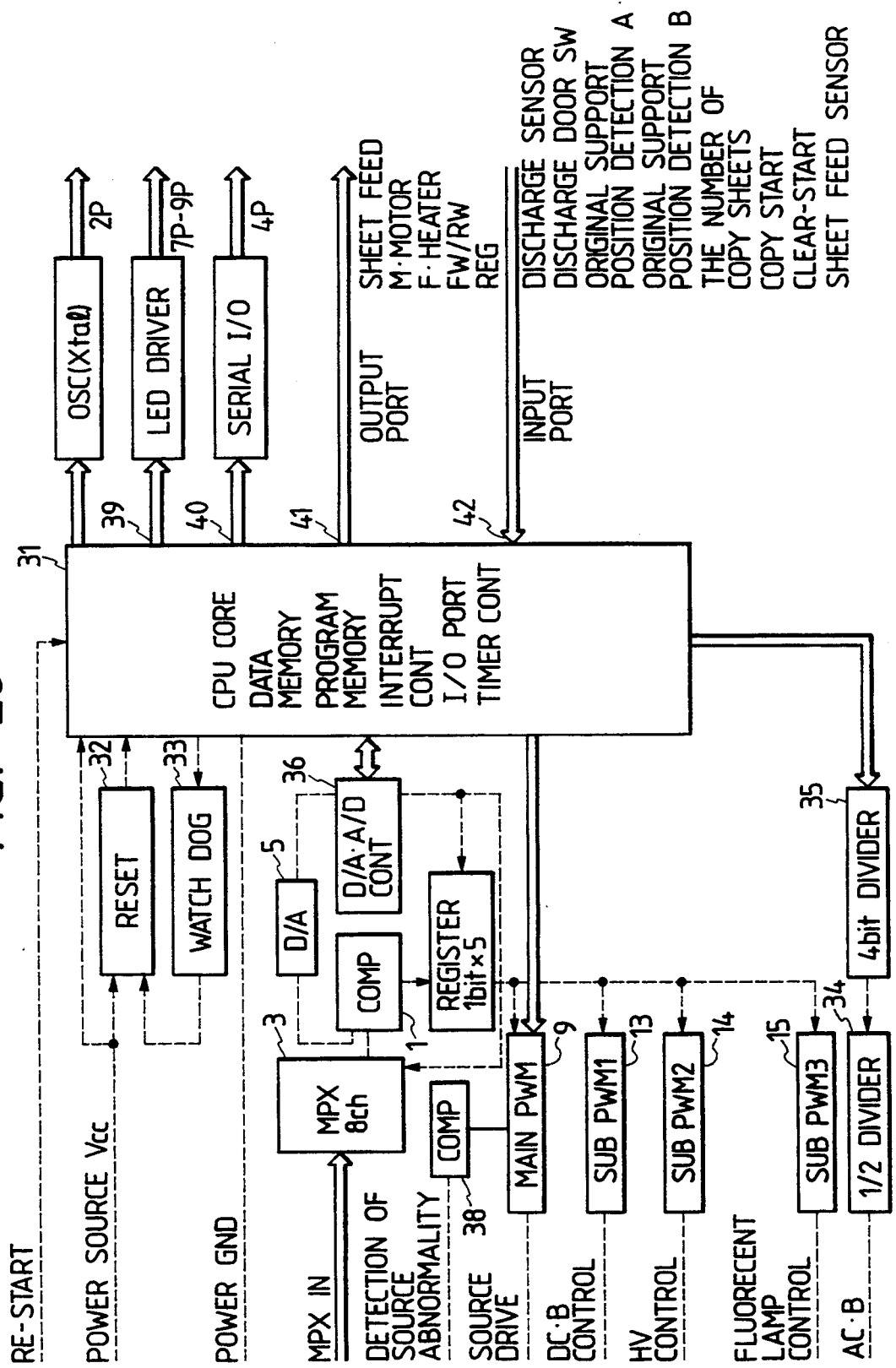

APPARATUS FOR CONTROLLING A POWER SOURCE

This application is a continuation of application Ser. No. 07/336,413 filed Apr. 10, 1989, now abandoned.

BACKGROUND OF THE INVENTION

The present invention relates to a controller suitable for use with image forming apparatus such as copying machines, printers and the like.

In a conventional image forming apparatus such as a copying machine, printer and the like, a sequence controller circuit for controlling loads such as motors, solenoids and the like and controlling turn on and off low voltage power sources, exposure lamp power sources, and charging power sources is mounted on a circuit board separately from the power sources.

Such a power source uses switching regulators which require a control circuit constructed of an error amplifier and a pulse width modulation (PWM) circuit, the former comparing a fraction (error signal) of the power source output with a reference signal, and the latter controlling the power source output in accordance with an output from the error amplifier. The error amplifier and pulse width modulation circuit are made of discrete circuits, or made of a power source control IC integrating both circuits in one chip.

In order to simplify the circuit for stabilizing a power source, a method has been proposed wherein stabilizing control is carried out by a sequence controller microcomputer using programs.

A conventional apparatus having necessary circuits formed on different circuit boards is difficult to be made compact.

Use of an error amplifier leads to a complicated circuit arrangement because the amplifier must satisfy the off-set voltage and frequency characteristics necessary for controlling the power source. Further, since a large capacity is interconnected between inputs and outputs for phase compensation, the input and output terminals are required to be mounted outside of the circuit board. Furthermore, it becomes necessary to use a large number of cells to deal with electrostatic problems, so that the error amplifier is difficult to be mounted together with digital circuits including a CPU.

Use of microcomputers and programs for controlling a power source necessiates high speed microcomputers and high speed and precision A/D converters. Such programs become complicated, and the peripheral analog circuits of microcomputers such as driver circuits, level conversion circuits and the like are made of discrete circuits, resulting in a hardship on compactness and simplification. Therefore, controlling a power supply by using microcomputers and programs is still not realized in practice.

In a conventional image forming apparatus such as a copying machine, printer and the like, various circuit elements have been provided independently and separately, the circuit elements including a sequence controller circuit whose main elements are a microprocessor for controlling the entirety of print sequence, a DC power source, and a high voltage power source such as an exposure lamp power source and charger. Therefore, there has been limits in making the apparatus compact and inexpensive.

In order to form such circuit elements on one board, it has been proposed to integrate microprocessors, RAMs, ROMs, digital peripheral circuits, A/D converters, D/A converters, pulse width modulation circuits (hereinafter called PWM circuits) for controlling power sources, and the like, all in one chip.

However, if circuit elements are integrated in one chip without any particular consideration, the circuit scale, particularly of PWM circuits becomes large, resulting in a large chip area with less cost effectiveness.

The following problems have been associated with a conventional PWM circuit.

FIG. 36 is a schematic circuit diagram showing the main portion of a conventional PWM control unit. This control unit is provided with an error amplifier 1 and an oscillator 2, the error amplifier comparing a detected output voltage with a set value and amplifying a difference therebetween. Obtained from a diode D1 is a DC level S10 which is used as a control level for controlling the output voltage. The oscillator 2 outputs a triangular wave signal S12 whose frequency is determined by a resister R1 and capacitor C1. The signal S12 is compared with the DC level S10 at a comparator 3. Switching elements are controlled to turn on and off in accordance with an output S13 from the comparator 3, to thus regulate the output voltage of a power supply. The maximum duty of PWM is determined by resistors R2 and R3. FIG. 37 shows the waveforms S10, S12 and S13. In FIG. 36, D2 represents a diode, and R4 represents a resistor.

The triangular signal S12 outputted from the oscillator 2 of the above PWM control unit is an analog signal. Therefore, there arise some problems in that disturbances of waveforms thereof due to noises are large, resulting in poor frequency precision, poor precision of upper and lower limits of the triangular wave, and hence large error in duty ratio settings.

SUMMARY OF THE INVENTION

The present invention has been made in consideration of the above problems, and it is an object of the present invention to provide an improved controller.

It is another object of the present invention to provide a controller integrating analog and digital circuits on the same chip while making the chip size small.

It is a further object of the present invention to provide a controller have a small circuit scale and chip area.

It is still a further object of the present invention to provide a controller allowing cost effectiveness.

It is another object of the present invention to provide a controller which is less susceptible to noises, and has high frequency precision, small error, and high reliability.

The above and other objects of the present invention will become apparent from the following description when read in connection with the accompanying drawings.

BRIEF DESCRIPTION OF THE DRAWINGS

FIG. 26 is a block diagram showing the overall arrangement of a controller having digital circuits such as microcomputers, main PWM circuit and three sub PWM circuits all integrated on the same chip;

DETAILED DESCRIPTION OF THE PREFERRED EMBODIMENTS

The embodiments of the present invention will be described hereinbelow.

Prior to giving a description of the embodiments, relevant art to this invention will be described with reference to the block diagram of FIG. 9 and the circuit diagram shown in FIG. 10.

Figures 9, 9A:
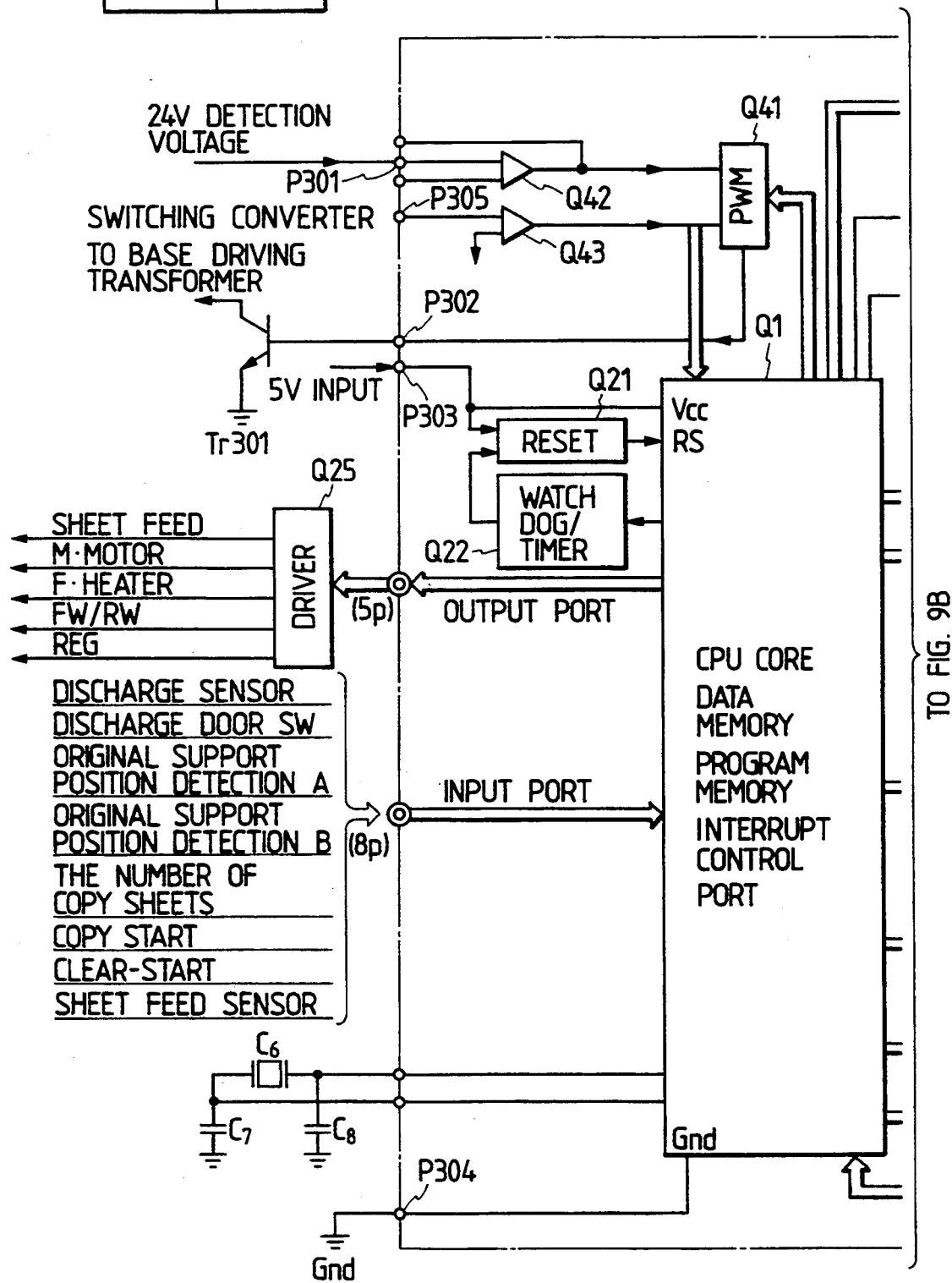
FIG. 9, consisting of FIGS. 9A and 9B, is a block diagram showing the structure of a controller relevant to the present invention.
Figure 9B:
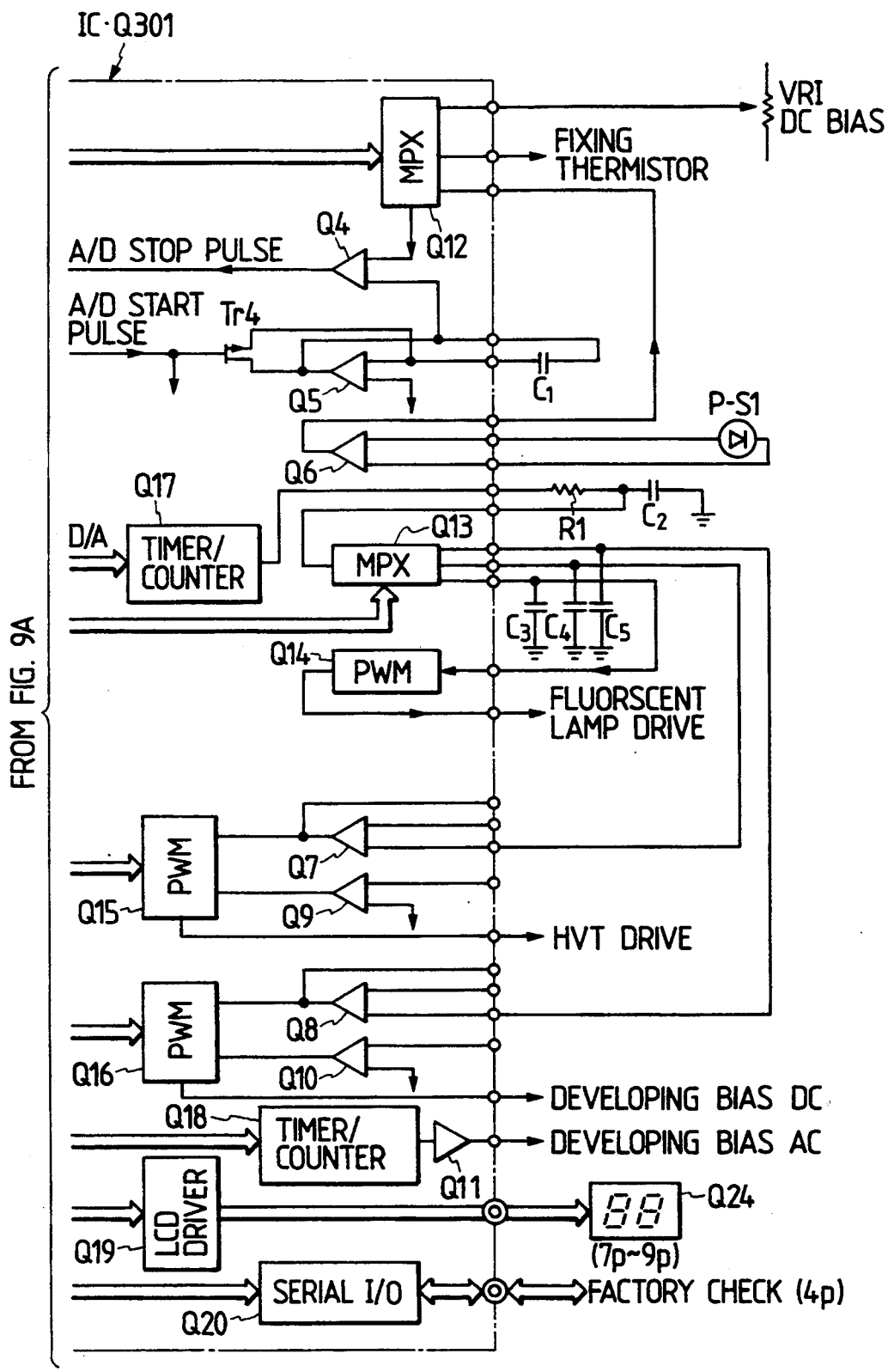
Figure 10:
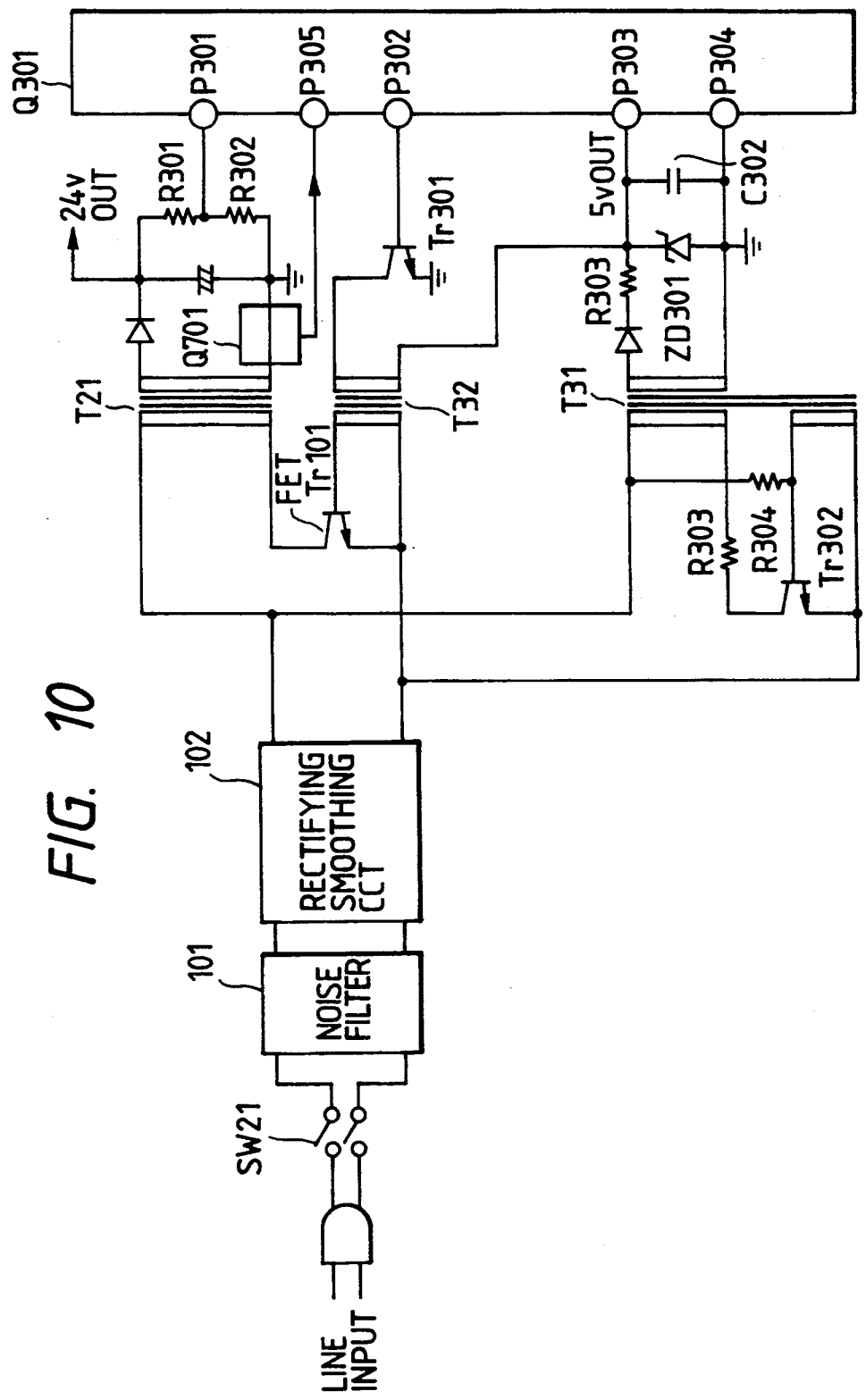
FIG. 10 is a circuit diagram of a switching regulator.

FIG. 9 is a block diagram showing the main part of a control circuit for an image forming apparatus. The circuit unit surrounded by a one-dot-chain line is integrated on one chip which is formed by C-MOS processes to make power consumption low.

Q1 represents a CPU core which includes an internal bus and the like.

The control circuit includes operational amplifiers or comparators Q4 to Q10, analog multiplexers Q12 and Q13, pulse width modulation circuits Q14 to Q16, timer counters Q17 and Q18, an LCD driver Q19, a communication control circuit Q20 with external apparatus, a reset circuit Q21 for resetting the circuit upon turning on a power, and a watch dog timer circuit Q22 for detecting CPU program runaway.

Comparator Q4, FET transistor Tr4, operational amplifier Q5 and capacitor C1 constitute an A/D converter which is controlled by CPU programs and is supplied with analog signals via analog multiplexer Q12. A voltage set by a density controlling rheostat VR1, a thermistor voltage for detecting a temperature of a fixing roller (not shown), and an output from a photodiode P-S1 for detecting the light quantity of a fluorescent lamp for applying light to an original, are A/D converted and inputted to CPU core Q1.

Timer counter Q17, resistor R1, capacitor C2 constitute a D/A converter controlled by CPU programs whose output charges capacitors C3, C4 and C5 via analog multiplexer Q13. The charged voltages are used as reference voltages for switching the light quantity of a fluorescent lamp, the high charging voltage, and the developing DC bias.

A power supply voltage 5 V for IC Q301 is obtained such that a smoothed line voltage is divided and isolated by a DC/DC converter constructed of a converter transformer T31, and a switching transistor Tr302. A rectified output from the secondary winding of converter transformer T31 is stabilized into +5 V via a zener diode ZD301 and supplied to a power supply input terminal P303 of IC Q301.

IC Q301 has been fabricated by C-MOS processes so that it consumes a current of only several mA. Upon supply of +5 V to IC Q301, the resets circuit Q21 reset the internal circuitry of the microcomputer which in turn starts a control operation in accordance with programs stored in ROM. After a predetermined time lapse after resetting, the pulse width modulation circuit Q41 is caused to operate and deliver its output pulse. The output pulse is supplied via output terminal P302 to the base of switching transistor Tr301 which is connected to the primary winding of gate drive transformer T32 of a converter transformer T21 of the switching power source. The primary winding of the converter transformer T21 has a switching FET Tr101 connected thereto.

An output voltage 24 V from the converter transformer T21 is divided by a predetermined ratio by resistors R301 and R302, and is supplied via terminal P301 to an error amplifier Q42 in a chip Q301 at one input terminal. The error amplifier Q42 compares the inputted voltage with a reference voltage supplied to the other input terminal, and supplies its output to the pulse width modulation circuit Q42.

The 24 V output is stabilized in the above-described manner for supply to various circuits.

The embodiment of this invention will be described with reference to the relevant art described above.

(1) 1st Embodiment

Figure 1:
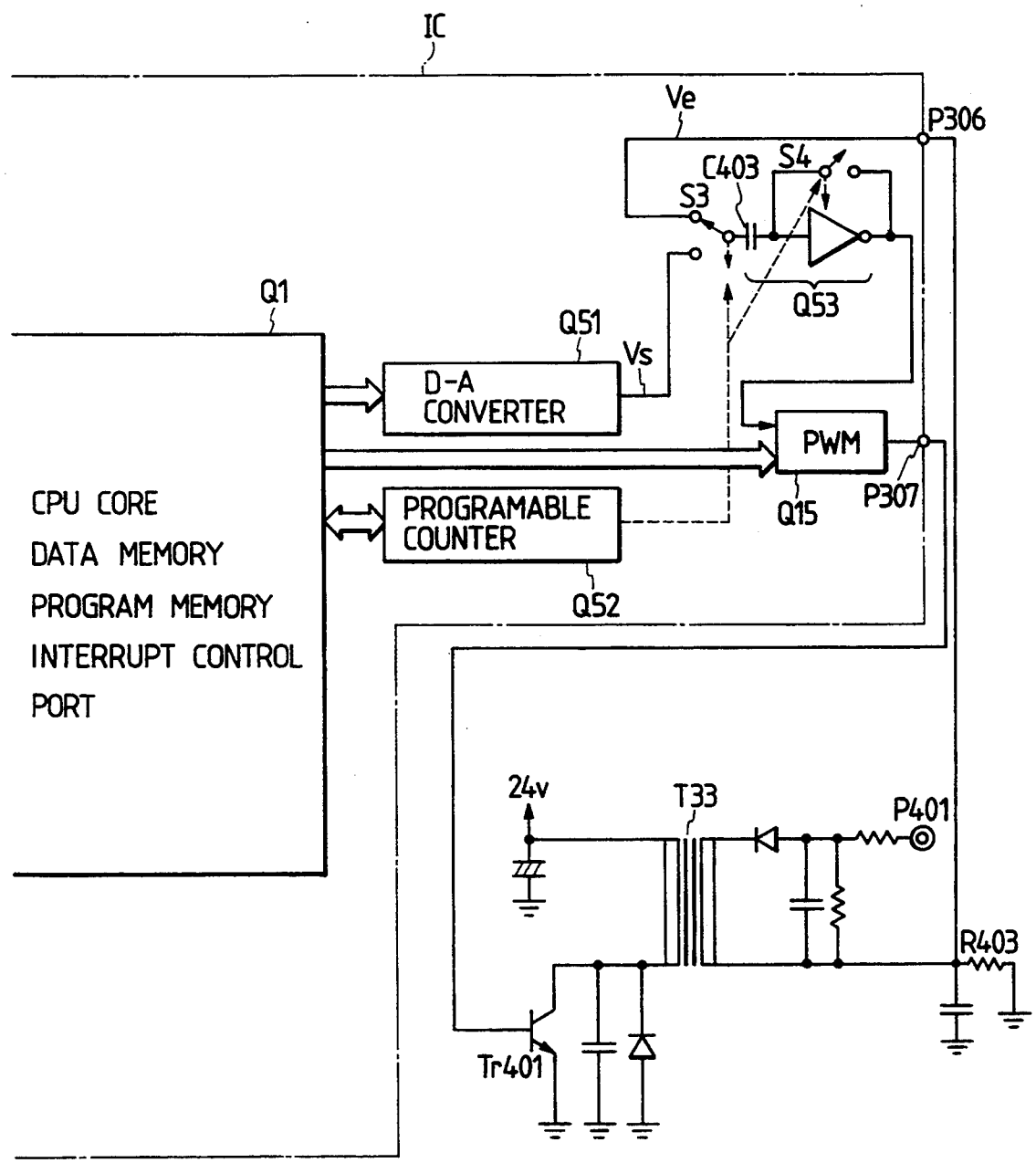
FIG. 1 is a block diagram showing the main part of an embodiment of a controller using a chopper type comparator according to the present invention.

According to the first embodiment, the portion (Q7, Q15) of the control circuit for charging the high voltage power supply shown in FIG. 9 is replaced with the circuit shown in FIG. 1.

The charging high voltage power source will be described with reference to FIG. 1, while omitting the description of the other circuit portions.

In FIG. 1, a chopper type comparator Q53 is constructed of a switch S3, capacitor C403, switch S4 and an ordinary C-MOS NAND gate which operate to open and close the input and output sides thereof.

Upon reception of an output from a programmable counter Q52, switch S4 is turned on and switch S3 is connected to the output side of the D/A comparator Q51, then the output and input voltages of the converter take a threshold voltage, i.e., Vcc/2 for the case of C-MOS so that the capacitor C403 is charged up to a voltage (Vs−Vcc/2).

At the next timing, the switch S4 is turned off and the switch S3 is connected to P306, then an error signal is provided. Namely, the error signal is a voltage Ve obtained at a detection resistor R403 by detecting a load current of a charger connected to high voltage output terminal P401. If Ve is larger than Vs, the output voltage from the comparator changes to a lower level, whereas if Ve is smaller than Vs, it changes to a higher level. The output from the comparator is supplied to pulse width modulation circuit Q15 constructed of an up-down counter which counts down when the output of the comparator is a low level, and counts up in the opposite case. The output from PWM Q15 is supplied via terminal P307 to the base of switching transistor Tr401 connected to the primary winding of the converter transformer T33. During a count-up operation, the conduction ratio of transistor Tr401 is raised, and during a count-down operation it is lowered.

The load current of the charging high voltage power source is controlled to a constant ratio relative to the set value Vs as described above.

According to the first embodiment, since a chopper type comparator can be realized only by a NAND gate, switch circuit and small capacitor, it occupies a very small chip area as compared with a general comparator or operational amplifier. Further, a large capacitor to be connected between the input and output sides of an operational amplifier is dispensed with so that the inverted input terminal and output terminal are not required to be mounted outside of the chip, resulting in a further small chip area and allowing the comparator to be integrated on the same chip of digital circuits including CPU.

(2) 2nd Embodiment

Figure 3:
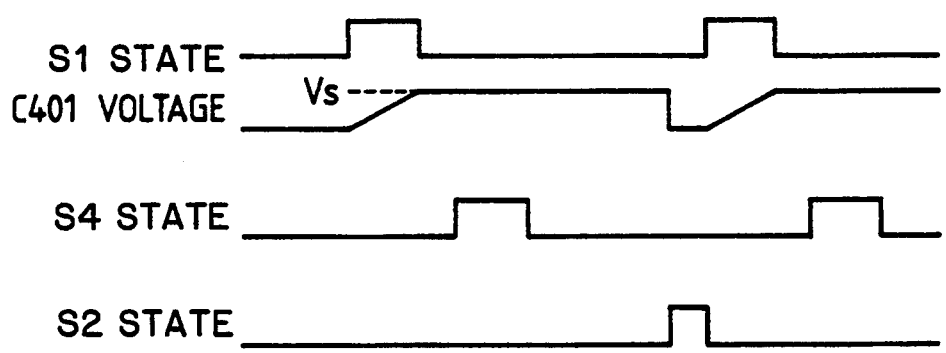
FIG. 3 is a timing chart illustrating the operation of the controller shown in FIG. 2.

In the second embodiment, the reference voltage to the comparator is obtained by adjusting the charge time to a capacitor C401 of a CR integration circuit under control of the programmable counter Q53 instead of using the D/A converter (refer to FIG. 1) of the first embodiment. Such control is illustrated in the timing chart of FIG. 3.

When an output from the programmable counter Q52 is supplied, the switch S1 is turned on and the capacitor C401 is charged via the resistor R401 from the power source Vcc. Upon turning off the switch S1, the charge voltage Vs is maintained as it is. Thereafter, upon turning on the switch S4 and connecting the switch S3 to terminal P306, the error voltage Vc inputted from terminal P306 is charged into the capacitor C403 and maintained therein.

Next, upon turning off the switch S4 and connecting the switch S3 to the C401 side, the output from the comparator is reversed depending upon the sign of a difference between Vc and Vs. The switch S2 discharges and resets the capacitor C301 before it is completely charged.

According to the second embodiment, instead of using a D/A converter which requires a large area, a programmable counter (or in some condition, this is also dispensed with), switching circuit, and small capacitor are used, thus making the chip area small.

(3) 3rd Embodiment

Figure 2:
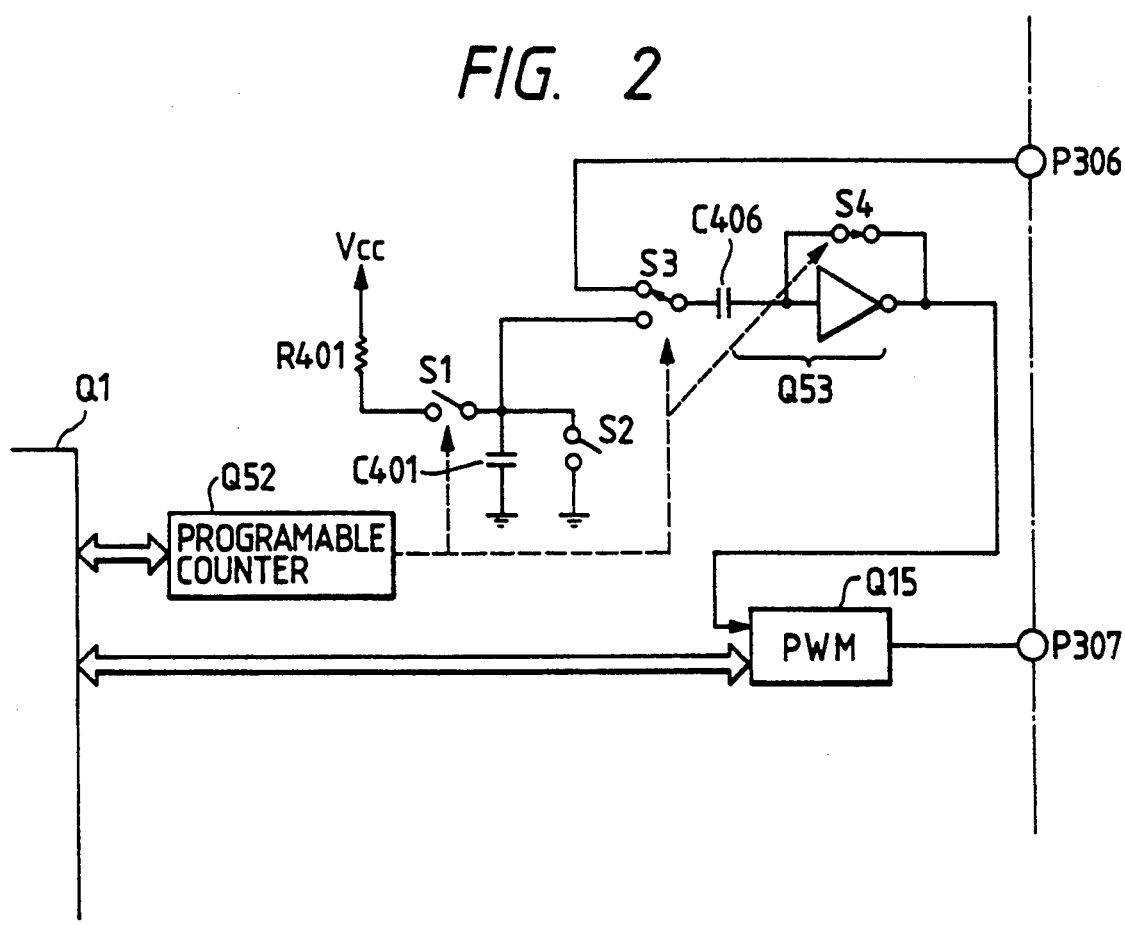
FIG. 2 is a block diagram showing the main part of a modification of the controller shown in FIG. 1.
Figure 4:
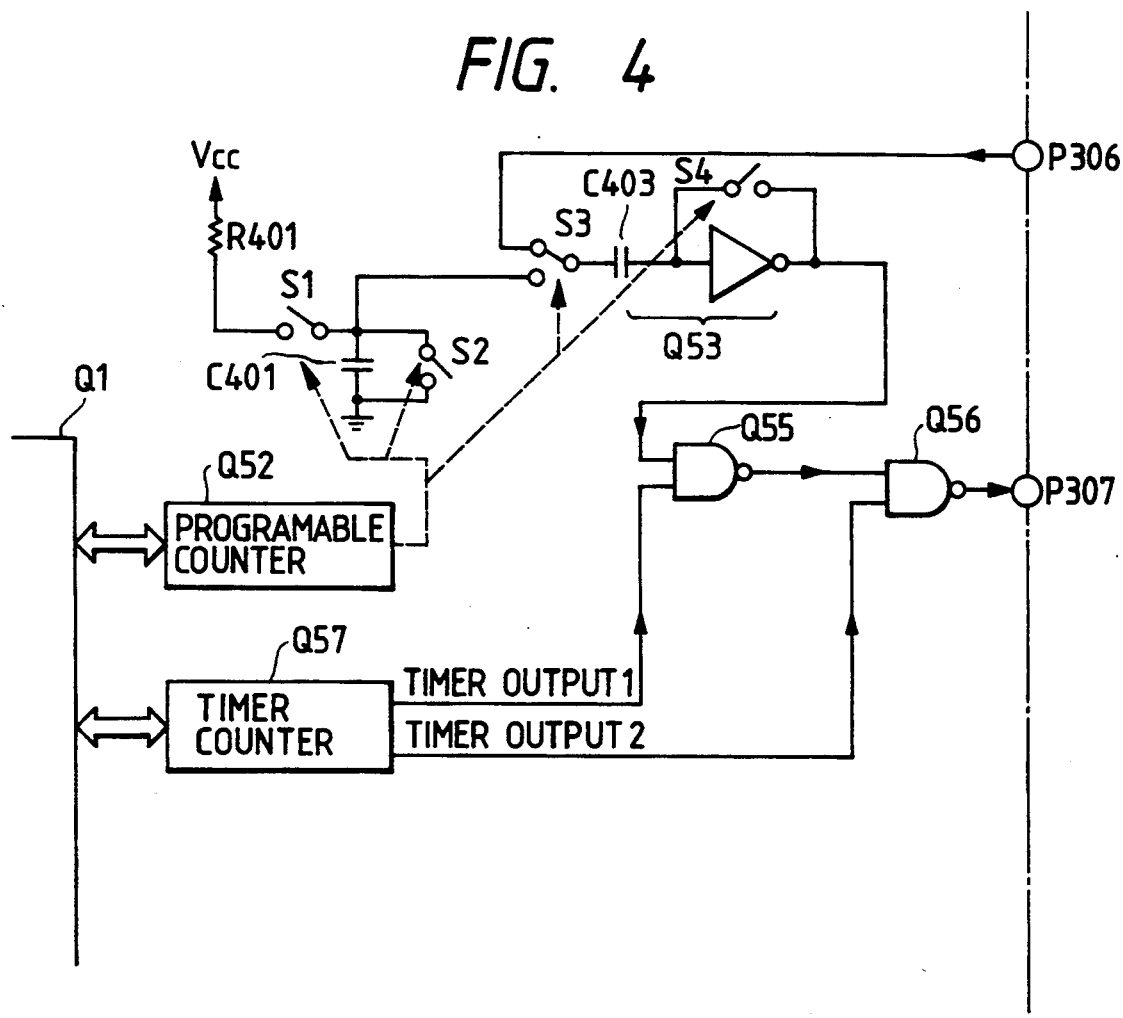
FIG. 4 is a block diagram showing the main part of a further modification of the controller shown in FIG. 1.

In the third embodiment, the PWM circuit Q15 of the second embodiment (refer to FIG. 2) is deleted, and instead an external switching element is directly driven by an output from the comparator Q53 as shown in FIG. 4.

A timer counter Q57 outputs (a) CPU clocks, (b) timer output 1 which is a count down output of CPU clocks by a predetermined ratio, and (c) timer output 2 which is an output having the same frequency as the timer output 1 and having a predetermined pulse width τ. An output from the chopper type comparator Q53 and the timer output 1 are subjected to NAND operation at a NAND gate Q55 whose output and the timer output 2 are subjected to NAND operation at a NAND gate Q56. An output (d) from the NAND gate Q56 is supplied to terminal P307.

The output from the NAND gate Q56 controls the switching element on the primary side of the power source converter transformer so that the error signal (an input to terminal P306) which is a detection signal of the power source output follows the reference voltage as indicated at e. Even if the comparator Q53 has no output signal, at least the timer output 2 is generated so that the switching frequency of the power source transformer is prevented from being lowered.

Figure 5:
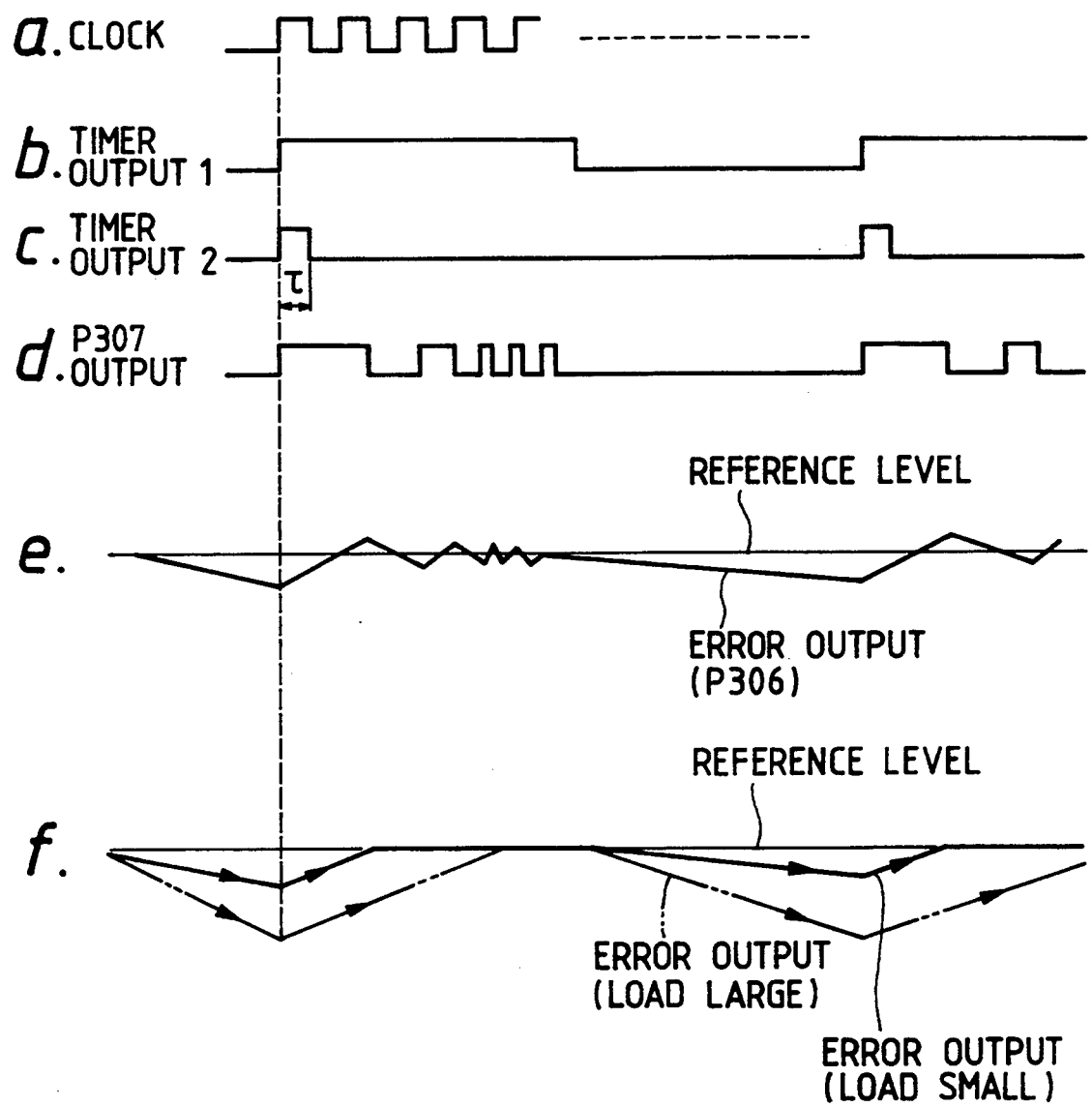
FIG. 5 shows waveforms at various circuit portions of the controller shown in FIG. 4.

How the error signal changes depending upon the quantity of power source load is indicated at f in FIG. 5.

According to the third embodiment, instead of using a PWM circuit requiring a large area, only a timer counter and two NAND gates are used, resulting in a small chip area.

(4) 4th Embodiment

Figure 6:
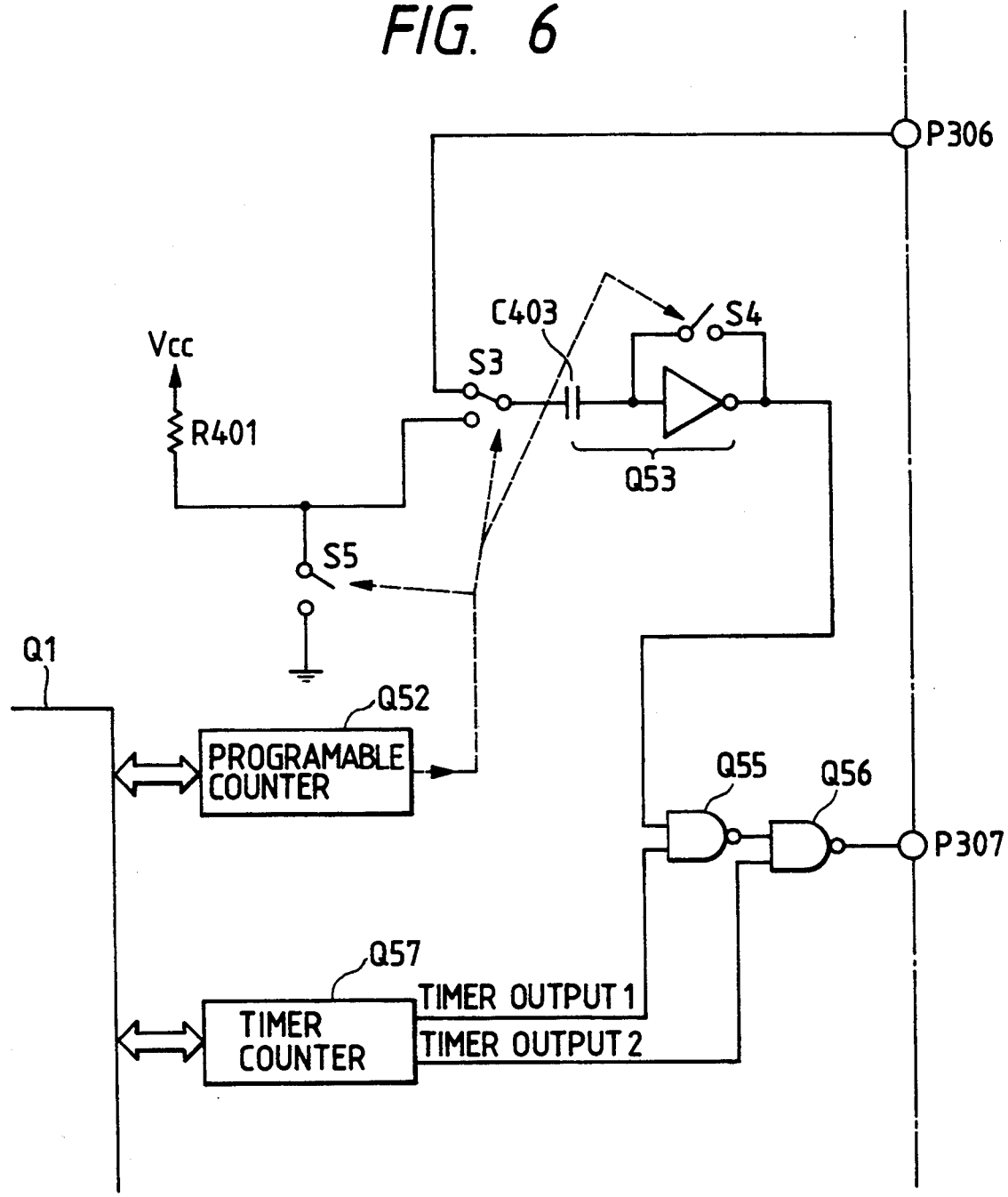
FIG. 6 is a block diagram showing the main part of another embodiment of the controller shown in FIG. 1.

FIG. 6 shows an example of a more simplified circuit of the third embodiment circuit.

In order to read (charge) the reference signal into the capacitor C403, after the switch S4 is turned on, the switch S3 is turned to the resistor R401 side for a time duration corresponding to the reference voltage and thereafter, it is turned to the terminal P306 side. After the capacitor C403 is charged to the reference voltage Vs via the resistor R401 from the power source Vcc and the switch S3 is turned to the terminal P306 (applied voltage Ve) side, an output from the chopper type comparator Q53 is reversed depending upon the sign of a difference between Vs and Ve. Switch S5 is used to reset the capacitor C403 to 0 volts via the switch S3 prior to the control operation.

Figure 7:
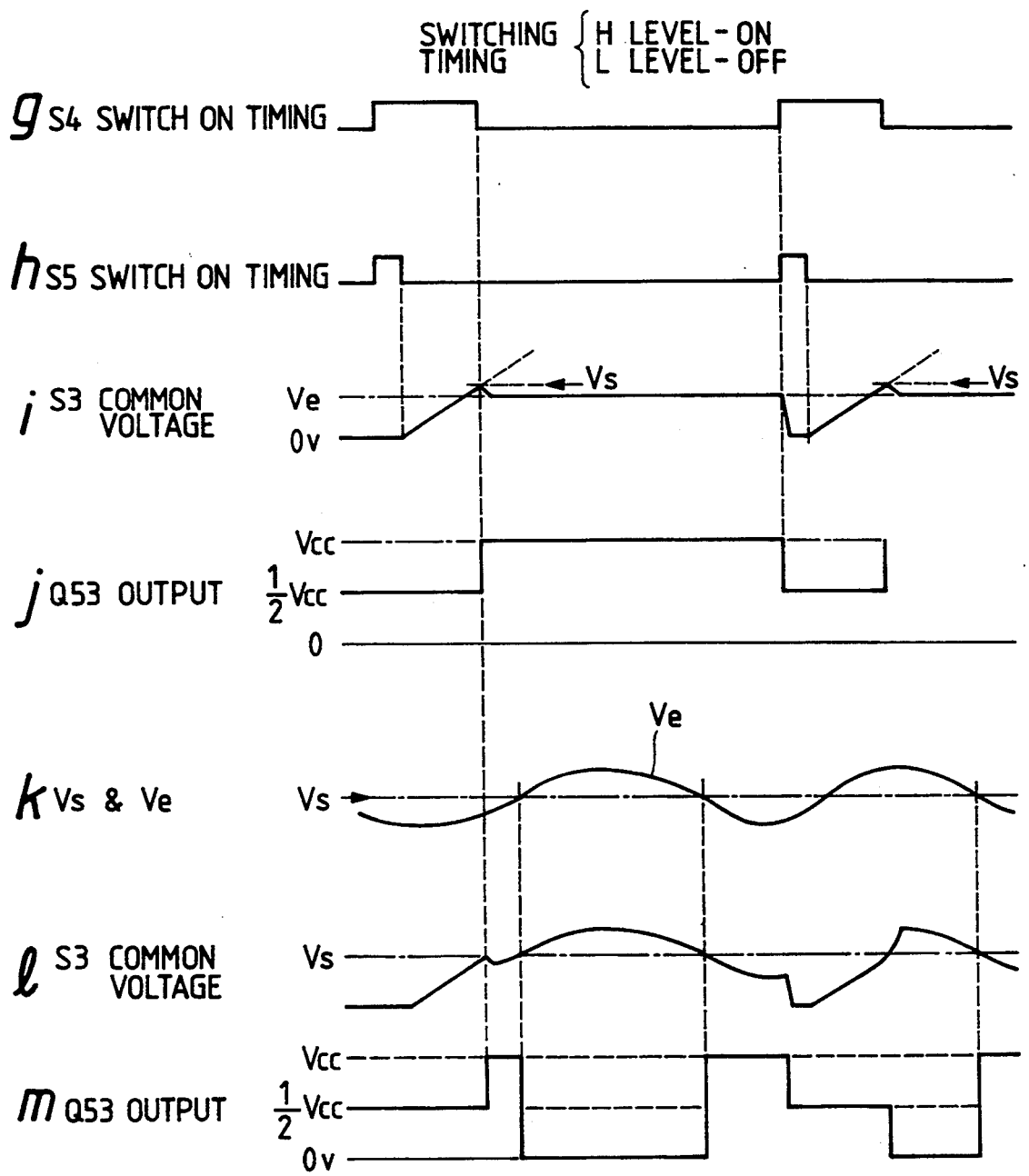
FIG. 7 shows waveforms at various circuit portions of the controller shown in FIG. 6.
Figure 8:
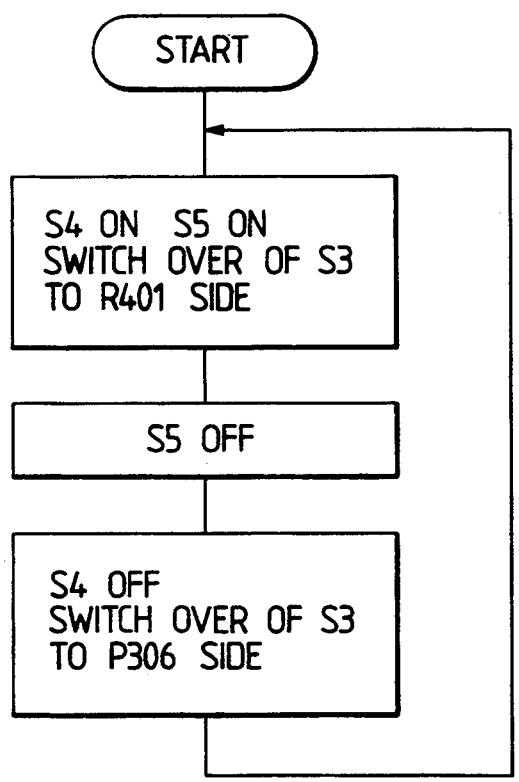
FIG. 8 is a flow chart illustrating the switching operation.

FIG. 7 shows voltage waveforms at various circuit portions of the fourth embodiment, and FIG. 8 is a flow chart illustrating the switching operation of the fourth embodiment.

According to the fourth embodiment, since the error signal and the reference signal are charged in the same capacitor, it is possible to suppress the degradation of control precision to be caused by capacitance variation of the capacitor. In addition, since the circuit arrangement is simple, the chip area can be made small.

In the first to fourth embodiments, a chopper type comparator has been used as a control circuit for the charging high voltage power source. Such arrangement is also applicable to the control circuit for other power sources.

As described previously, (a) analog circuits for controlling power sources of an image forming apparatus together with sequence control CPU and its peripheral digital circuits can be integrated in a single chip. (b) The power source is not controlled by sequence control programs of a microcomputer, but controlled independently by analog circuits. (c) An IC inclusive of analog circuits can be fabricated by C-MOS processes. (d) The control circuit for a power source are wired within a chip so that the number of bonding pads to external circuits is reduced. (e) The chopper type comparator used in the control circuit for a power source can be constructed of NAND gates and switch circuits, so that the chip area can be made small, a large portion of the control circuit for the apparatus can be integrated into a single chip, and an image forming apparatus can be realized which is compact, cost effective and highly reliable.

Next, description will be made on an example where a single comparator is shared by a plurality of PWM circuits.

Prior to describing the embodiments, the overall control system for an image forming apparatus using PWM circuits will be first described.

Figure 11:
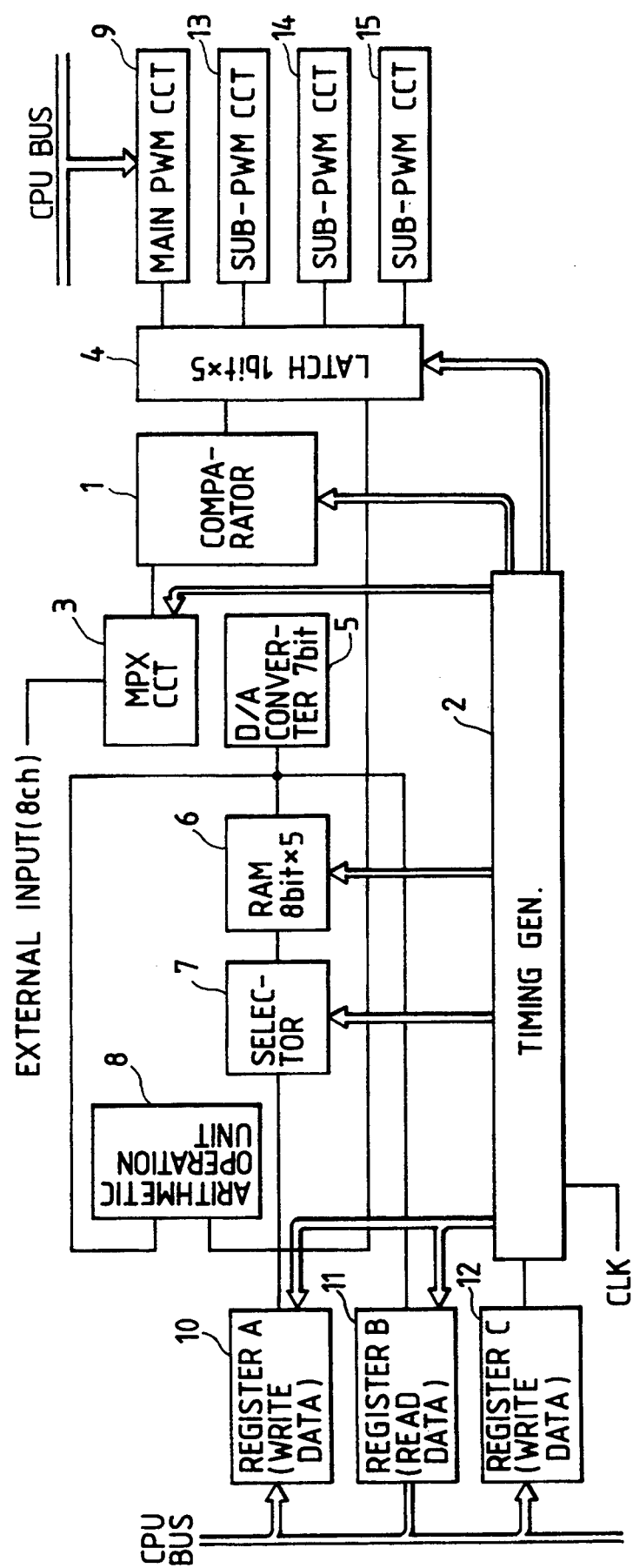
FIG. 11 is a block diagram showing an A/D-D/A controller using a PWM circuit.

FIG. 11 is a block diagram showing the overall control system A/D - D/A controller.

The A/D - D/A controller operates in two modes, i.e., A/D converter operation mode and a PWM control circuit operation mode.

First, the A/D converter operation mode will be described. An analog value selected by an analog multiplexer (MPX) circuit 3 and a reference voltage from a D/A converter 5 are compared with each other at a comparator 1. The comparison result is stored in a latch 4 at a predetermined bit. While referring to the comparison result, the next reference voltage is determined by an arithmetic operation unit 8 and compared with the analog value. Such comparison is repeated until the reference voltage from the D/A converter 5 becomes as equal as possible to the analog value while determining beginning from the most significant bit to the least significant bit by the arithmetic operation unit 8. After all the bits have been determined, the value is latched as an A/D conversion value in a register B.

An analog value selected by the MPX circuit 3 is A/D converted in the manner as described above.

Next, the PWM control circuit operation mode will be described.

An external input from the MPX circuit 3 is compared with a reference value outputted from the D/A converter 5 at the comparator 1. The comparison result is latched in the latch 4 at a corresponding bit. An output from the latch 4 is supplied to a corresponding one of main PWM circuit 9 and sub PWM circuits 13 to 15.

Data transfer between the A/D - D/A controller and CPU is carried out via registers A, B and C shown in FIG. 11. Register A is used for storing data in a D/A conversion table. Register B is used for sending a A/D conversion result to CPU busses. Register C is used for setting the status of A/D - D/A conversion operation and the like, and for setting addresses of RAM 6, MPX circuit 3, latch 4 and the like.

As described above, the A/D - D/A controller has the PWM control circuit operation mode and A/D converter operation mode while controlling the timings of each operation. Data transfer among CPU busses is carried out via respective registers.

Figure 12:
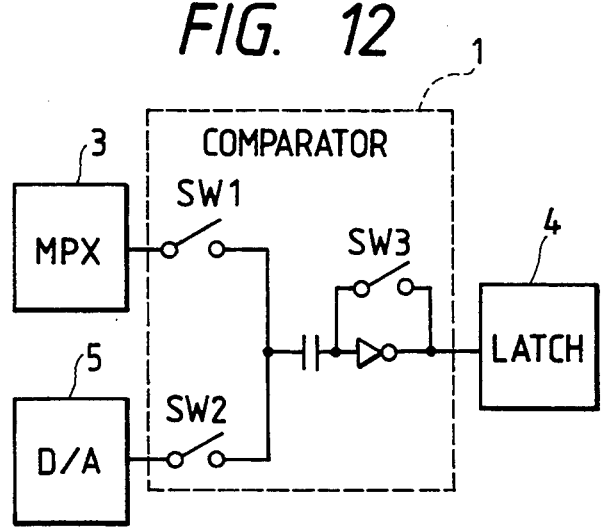
FIG. 12 is a schematic diagram showing the structure of a comparator.
Figure 13:
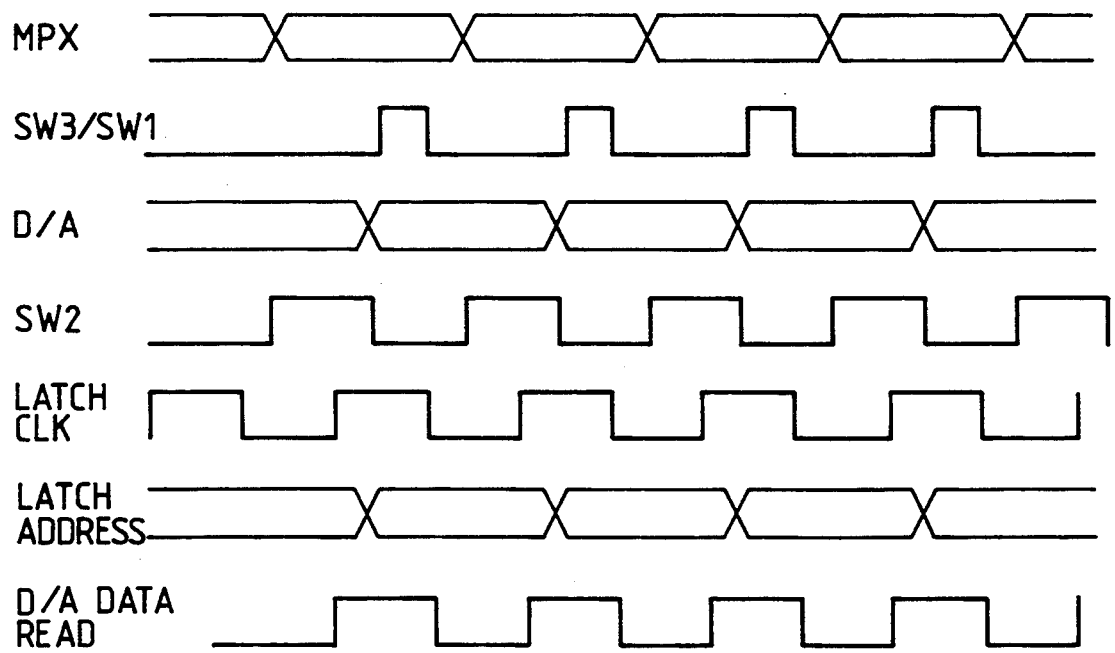
FIG. 13 is a timing chart illustrating the operation of the controller shown in FIG. 11.

FIG. 12 shows an example of the comparator shown in FIG. 12, and FIG. 13 is a timing chart illustrating the operation of the comparator.

The operation of the comparator 1 will be described.

The MPX circuit 3 is switched to receive external input data to be compared in accordance with an output from the timing generator 2. Next, switches SW1 and SW3 are turned on and a switch SW2 is turned off so that the external data selected by the MPX circuit 3 are inputted to the comparator. At the same time, data to be D/A converted are selected from the D/A conversion table on RAM 6 and set at the D/A converter. Next, the switch SW2 is turned on and the switches SW1 and SW3 are turned off so that the value selected by the MPX circuit 3 is compared with the D/A converted reference value, the comparison result being stored in the latch.

Figure 14:
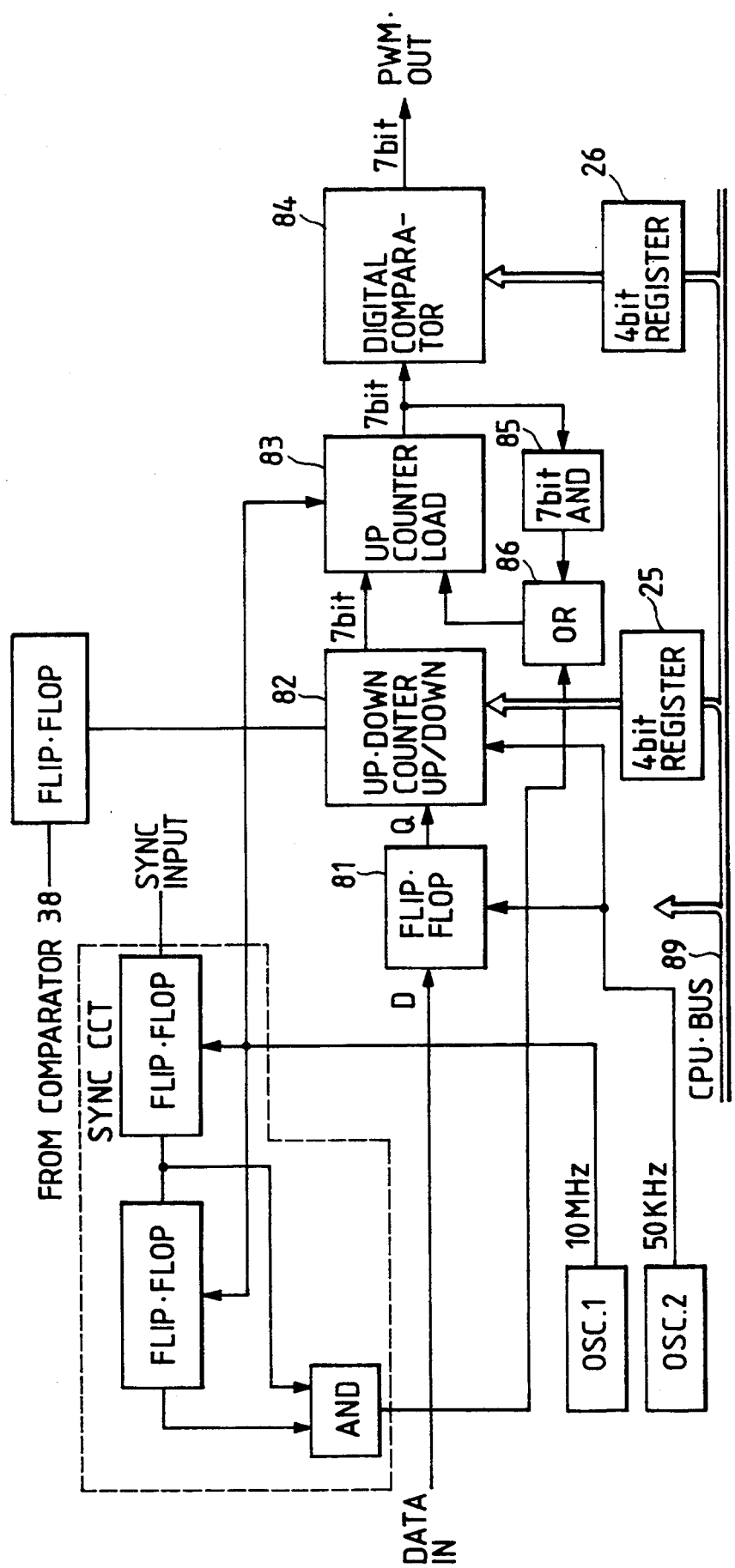
FIG. 14 is a block diagram of a main PWM circuit.

FIG. 14 is a block diagram showing an example of the main PWM circuit shown in FIG. 11. In the A/D-D/A controller at the preceding stage, the comparison result of the input from the multiplexer at the analog comparator is held in the latch 4. This comparison result is inputted to a flip-flop 81 in the main PWM circuit. The inputted comparison result at the analog comparator is stored in the flip-flop 81 in synch with 50 KHz clocks, and then supplied to the up/down terminal of the next up/down counter 82. At this time, the initial upper 4 bits from a counter is inputted to the up/down counter 82 via a 4 bit register from a CPU bus 89. The initial value is counted up or down in accordance with the value supplied to the up/down terminal in synch with 50 KHz clocks. The count result is sent to the next up counter 83 and read therein in synch with a load signal supplied thereto to start counting 10 MHz clocks. As the load signal, an output from an OR gate 86 supplied when 10 MHz clocks generated at a synchronization circuit coincidence with a signal generated from an AND gate 85, when the up/down counter 83 reaches a predetermined count value. An output signal from the up/down counter 83 is compared at a digital comparator 84 with a value set in the 4 bit register from the CPU bus 89. The comparison result is outputted as a PWM output. In the FIG. 14, an output from the up/down counter 83 is coupled to a 7 bit AND gate 85 to detect the completion of count operation. An output from the up counter 83 and an output from the synchronization circuit is subjected to OR operation at an OR gate 86 whose output is supplied to the load terminal of the up counter 83 to read data from the up/down counter 82. The up/down counter 82, up counter 83 and digital comparator 84 is of 7 bit configuration to satisfy the necessary precision.

With reference to the structure and operation of the overall control system of the image forming apparatus, the embodiments will be described.

Figure 15:
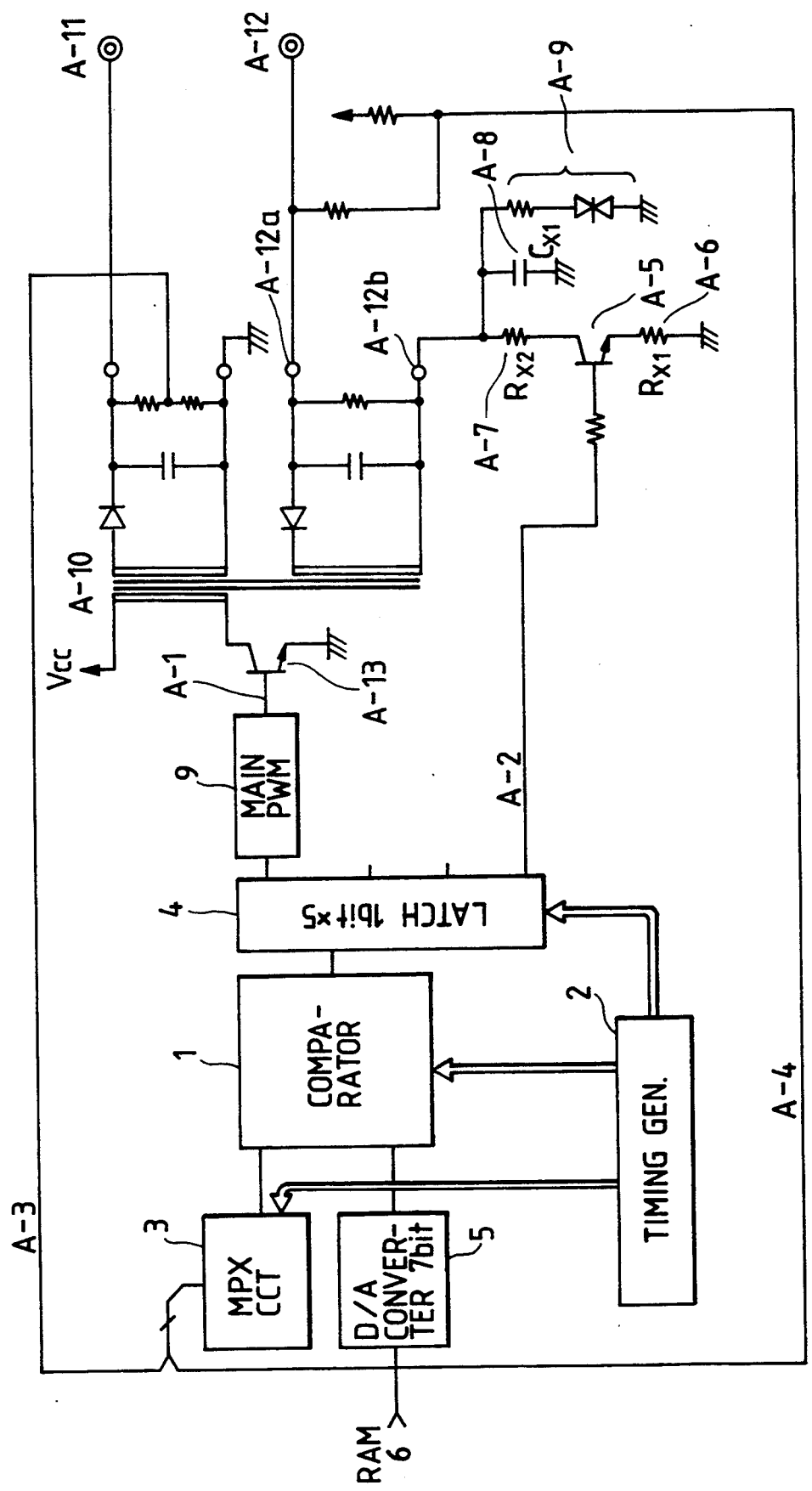
FIG. 15 is a block diagram of a power source using a PWM circuit.

FIG. 15 is a circuit diagram showing a pulse width modulation circuit of an embodiment according to this invention, and a stabilized power source using the PWM circuit.

An output A-1 from the main PWM circuit 9 drives a main transistor A-13 which drives the primary winding of a transformer A-10, to thus obtain an output A-11 from one of the secondary windings. The output A-11 is divided and fed back as an A-3 signal, and inputted to one input of the an MPX circuit 3. The A-12 output is derived from the other of the secondary windings of the transformer A-10. The lower potential side of A-12 output is grounded via a capacitor A-8, and connected to one end of a resistor A-5 whose other end is connected to the collector of a transistor A-5. The emitter of the transistor A-5 is connected to one end of a resistor A-6 whose other end is grounded. An output A-2 from a sub PWM circuit drives the base of a sub transistor A-5 via a resistor. The output A-12 is resistor-divided and fed back as a feedback signal A-4 which is inputted to one of the input terminals of the MPX circuit 3. The feedback signals A-3 and A-4 are divided by suitable division ratios sufficing the operation range of the MPX circuit 3, comparator 1 and the like, and the division resistors are pulled up to Vcc or down to ground depending upon the polarity of the outputs A-11 and A-12.

Elements indicated at A-9 are a varister and current limiting resistor which protect the transistor A-5 when the lower potential side of the output A-12 rises excessively. RAM 6 stores the set values of the outputs A-11 and A-12.

The operation of the above embodiment will be described in detail.

Upon reception of an output from the timing generator 2, the MPX circuit 3 selects A-3 input and supplies it to one input terminal of the comparator 1. At the same time, the set value of A-11 output is read out from RAM 6 at a corresponding address and supplied to the D/A comparator 5 which in turn generates the corresponding analog value to be supplied to the other input terminal of the comparator 1. The comparator 1 compares the output from the MPX circuit 3 with the output from the D/A converter 5, and outputs a high or low level signal depending upon the difference between the two inputted signals. At this time, the timing generator 2 supplies a bit corresponding to the main PWM circuit 9 as well as a latch signal to the latch 4 so that the high or low level signal from the comparator 1 is latched. An output from the latch 4 is supplied to the main PWM circuit 9, i.e., as described previously, to the up/down terminal of the up/down counter thereof. Consequently, the pulse width modulated output A-1 from the main PWM circuit 9 drives the main transistor A-13 to thus control the A-11 output to a constant voltage. The operation of the main PWM circuit has been described so far.

Next, upon reception of an output from the timing generator 2, the MPX circuit 3 sets an A-4 input and supplies it to the one input terminal of the comparator 1. At the same time, the set value of A-12 output is read from RAM 6 at a corresponding address, and supplied to the D/A converter which in turn converts it into an analog voltage and supplies to the other input terminal of the comparator 1.

In the similar manner as described above, the comparator 1 compares the two inputted signals and generates a high or low level signal depending upon the difference therebetween. The high or low signal is supplied to the latch 4 which stores it at the bit corresponding to the A-2 output in synchro with an output from the timing generator 2. The A-2 output drives the transistor A-2 via the resistor to thus control the A-2 to a constant voltage.

The above operations are carried out in a single operation cycle. The above embodiment has used two output transformers, however, it is also applied to the case where a number of PWM circuits are used.

As described above, the sub PWM circuit compares the set value and output value each operation cycle T and generates a pulse train of high and low signals to control the on/off period of the transistor A-5 and hence the A-12 output to the set value.

In summary, the comparator 1 compares an input signal from the MPX circuit 3 with the reference signal from the D/A converter 5. The latch 4 serves as a memory means for storing an output from the comparator 1. The timing generator 2 serves as a means for updating the memory contents of the memory means at predetermined time intervals. The memory contents correspond to the output signal from the PWM circuit which are constructed of these circuit elements.

The rectifying power source for the A-12 output, and the transistor A-5 and the like connected to the power source, are controlled by the pulse width modulation circuit. This pulse modulation circuit and feedback means for resistor-dividing the A-12 output and feeding it back to the MPX circuit 3 constitute the stabilized power supply of the embodiment according to this invention.

The operation of the stabilized power source will then be described.

Figure 16:
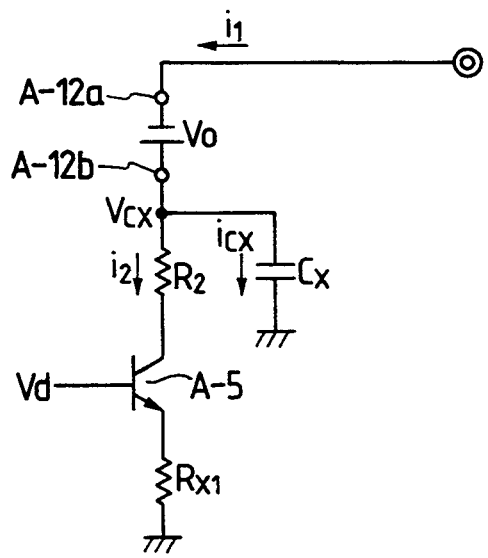
FIG. 16 shows an equivalent circuit of the main part of the power source shown in FIG. 15.

The A-1 output is stabilized as in the following. The voltages appearing at the lower potential side A-12b and higher potential side A-12a of the A-12 output winding follow the A-11 output because the A-11 output is fed back to the primary winding of the transformer A-10. Assuming that the A-11 output is in a steady state, the voltage across the A-12a and A-12b sides take a certain constant voltage V0. An equivalent circuit of the main circuit portion for the A-12 output can be represented as shown in FIG. 16. In FIG. 16, a current flowing into A-12a is represented by $i_1$, a current flowing into the transistor A-5 is represented by $i_2$, the base potential of the transistor A-5 when it is being turned off, i.e., when the signal A-2 is low, is 0 V, and the base potential of the transistor A-5 when it is being turned on, i.e., when the signal A-2 is high. The off-time of the transistor A-5 is represented by $t_1$, the on-time by $t_2$ and the voltage at A-12a by $V_{Cx}$.

During an off state of the transistor A-5, the capacitor Cx is charged by current $i_1$, and during an on state it is charged by current $i_1-i_2$. The current $i_{Cx}$ flowing into Cx can be given by:

$$i_{Cx} = i_1 \quad (A-5: \text{OFF})$$

$$i_{Cx} = i_1 - i_2 \quad (A-5: \text{ON})$$

$$i_2 = (V_d - V_{BE})/R_{x1}$$

($V_{BE}$: base-emitter voltage of A−5)

$V_{Cx}$ is given by:

$$V_{Cx} = \int \Delta V_{Cx} = \int \frac{1}{Cx} \cdot \Delta i_{Cx} = \frac{1}{Cx} \cdot \int \Delta i_{Cx}$$

where $$\Delta i_{Cx} = i_1 \cdot t_1 + (i_1 - i_2) \cdot t_2$$
$$= i_1 \cdot (t_1 + t_2) - i_2 \cdot t_2$$

Figure 17:
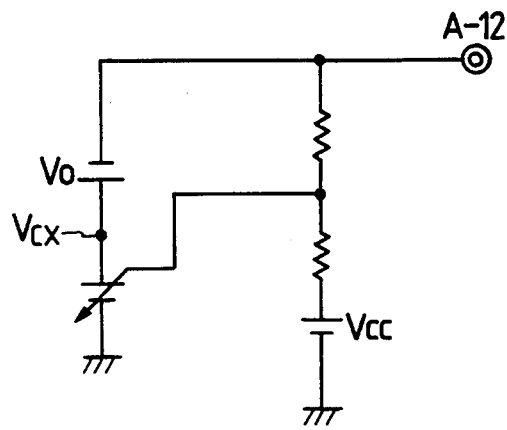
FIG. 17 is a conceptual view of the equivalent circuit.

If $\Delta i_{Cx}=0$ stands, the average voltage of $V_{Cx}$ is stabilized and hence the A-12 output becomes a stabilized voltage $V_0 + V_{Cx}$. FIG. 17 is a conceptual view of the equivalent circuit shown in FIG. 16. Since the A-12 output is divided as shown in FIG. 17 and fed back to control the A-2 signal, the constant voltage operation is ensured.

$t_1$ and $t_2$ are an integer multiple of the cycle T:

$$t_1 = n_1 \cdot T_1 \quad T_2 = n_2 \cdot T$$

($n_1$ and $n_2$ are an integer.)

Since $n_1$ and $n_2$ are not 0. Because, if $n_2$ is 0, then $$\Delta i_{Cx} = (i_1 - i_2) \cdot n_2 \cdot T$$

so that stabilization cannot be obtained. Alternatively, if $n_1$ is 0, then $$\Delta i_{Cx} = i_1 \cdot t_1 > 0$$

If $i_1$ is equal to $i_2$, then $\Delta i_{Cx}$ is 0. However, there is a steady deviation in the feedback system so that $i_1$ is not equal to $i_2$ so that $\Delta i_{Cx}$ is not 0 and stabilization cannot be obtained.

The peak-to-peak value of a ripple voltage is given by:

$$\Delta V_{rp1} = \frac{1}{Cx} (\Delta i_x(+) + \Delta i_x(-))$$
$$= \frac{1}{Cx} \cdot T \cdot (i_1(n_1 + n_2) + i_2 \cdot n_2)$$

The minimum peak-to-peak value is given by:

$$\Delta V_{rp1} = \frac{1}{Cx} \cdot T \cdot (2 \cdot i_1 + i_2)$$

Accordingly, the smaller the values of T, $i_1$ and $i_2$ become, the smaller the ripple becomes. The current $i_1$ takes a certain value of the output current. The current $i_2$ is not made excessively small so as to maintain a suitable response characteristic to a rapid change in the load. The cycle T is a constant. Although a large Cx makes a smaller ripple, this capacitor cannot be made very small in view of the response characteristic. Thus, the parameters are determined based on the allowable ripple value and the output current value.

Figure 18:
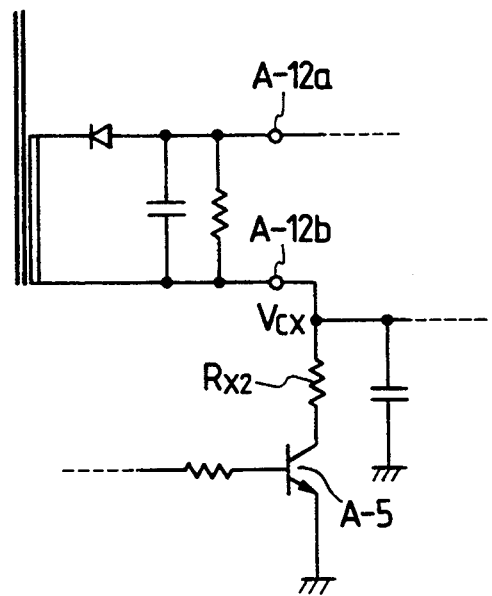
FIG. 18 is a block diagram showing a modification of the power source shown in FIG. 15.

In the embodiment shown in FIG. 15, the transistor A-5 operates at a constant current while it is turned on. However, the transistor may operate in a switching state through modification as shown in FIG. 18.

In this case, the current $i_2$ is given by $i_2 = V_{Cx}/R_{x2}$, and the voltage $V_{Cx}$ is given by:

$$C_{Cx} = \frac{1}{Cx} \int \Delta \left( i_1(t_1 + t_2) - \frac{V_{Cx}}{R_{x2}} \cdot t_2 \right)$$

The above equation is somewhat difficult in its solution. However, assuming that $V_{Cx}$ is a constant during a stabilized state and $V_{Cx}/R_{x2} = i_2$, then the equation can be solved in the similar manner. With this circuit arrangement, the resistor $R_{x1}$ can be dispensed with.

As described in the foregoing, the scale of a PWM circuit can be made small with a small integrated chip area. The stabilized power source using the PWM circuit as the control circuit can be realized by using a small size control circuit, resulting in a small chip area and considerably reduced cost.

Figure 19:
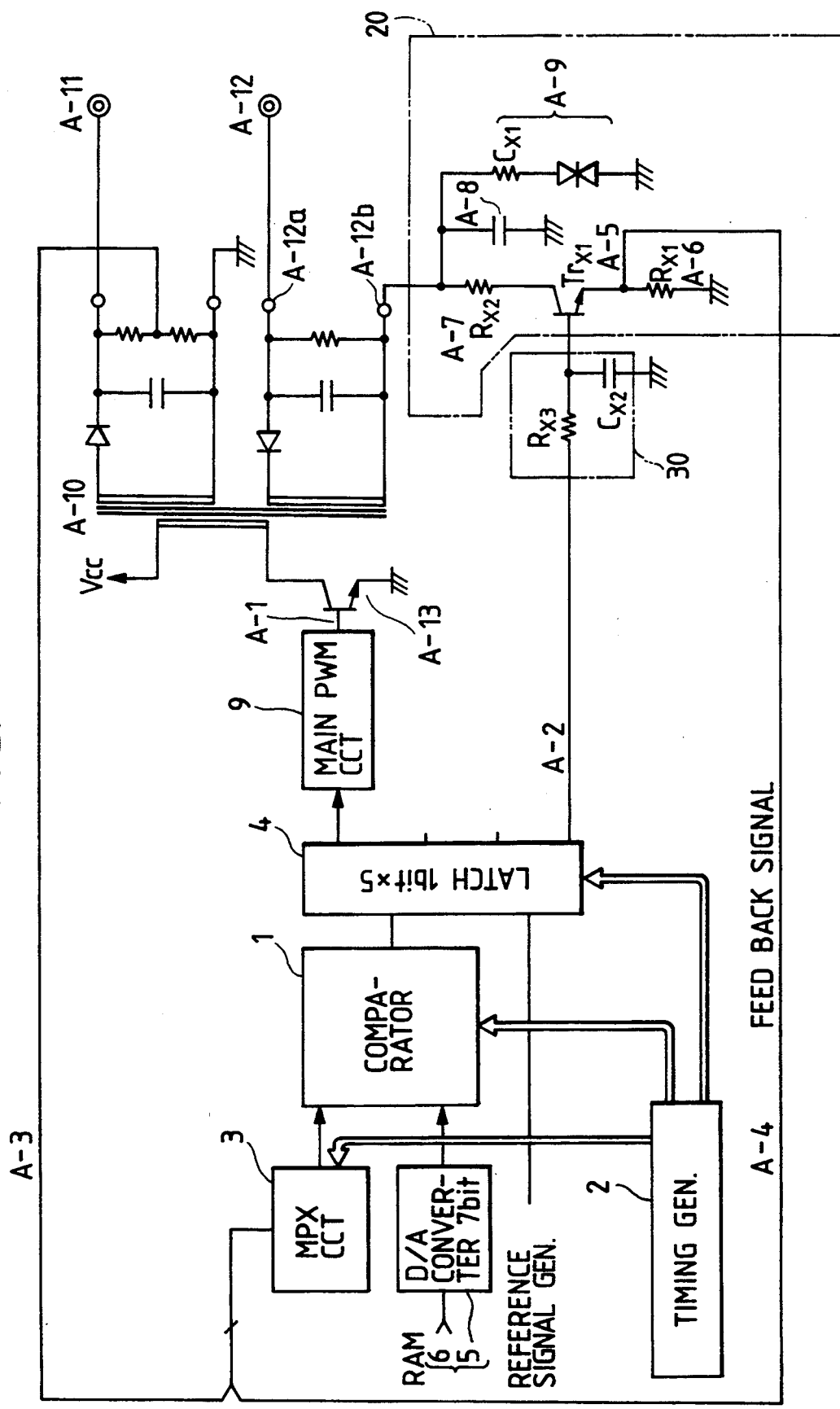
FIG. 19 is a block diagram showing a power source using a PWM circuit for conducting constant current control.

The embodiment shown in FIG. 15 has carried out a constant voltage operation. However, a constant current operation may be used, an example of which is shown in FIG. 19. In FIG. 19, similar elements to those in FIG. 15 are represented by using identical reference numerals.

The output A-12 of the sub PWM circuit is derived from one of the primary windings of the transformer A-10. The lower potential side of the A-12 output is connected to one end of a capacitor Cx1 whose other end is grounded, and connected to one end of a resistor Rx2 A-7 whose other end is connected to the collector of a transistor Trx1. The emitter of the transistor Trx1 is connected to one end of a resistor Rx1 A-6 whose other end is grounded. An output A-2 from the latch 4 drives, via a low-pass filter 30 constructed of a resistor Rx3 and capacitor Cx2, the base of the transistor A-5. A feedback signal A-4 from the emitter of the transistor, i.e., from the higher potential side of the resistor Rx1, is supplied to one input terminal of the MPX circuit 3. The feedback signals A-3 and A-4 are divided by suitable division ratios so as to match the operation range of the MPX circuit 3, comparator 1 and the like, and are pulled up to Vcc or down to ground via a proper resistor in accordance with the polarity of the signals A-11 and A-12.

Circuit elements A-9 are a varister and current limit resistor which are used for protecting the transistor A-5 when the lower potential side A-12a of the output A-12 rises excessively. RAM 6 stores the set values of the outputs A-11 and A-12. The circuit inclusive of the transistor A-5 and exclusive of the low-pass filter constitutes control means 20.

The operation of this circuit will be described next. The operation by the main PWM circuit is similar to that of the embodiment shown in FIG. 15 so that the description therefor is omitted and the operation of the sub PWM circuit will be described.

Upon reception of an output from the timing generator 2, the MPX circuit 3 selects the A-4 input and supplies it to one input terminal of the comparator 1. At the same time, the set value of the output A-12 is read from RAM 6 at the corresponding address, and inputted to the D/A converter 5 which in turn converts it into an analog voltage and supplies it to the other input terminal of the comparator 1.

In a similar manner as described previously, comparator 1 compares the two input signals and outputs a high or low signal depending upon the difference therebetween. The high or low signal is latched at the latch 4 at the address corresponding to the A-2 output in accordance with a signal from the timing generator 2. The A-2 output drives the transistor A-5 via the resistor Rx3 and capacitor Cx2 to perform the operation to be described later. The above description is for the sub PWM circuit operation.

The above operations are repeated as a one operation cycle T.

Based on the comparison result of the set value with the output signal, the sub PWM circuit outputs at each operation cycle T a pulse train of high and low signals, the pulse train being composed of high period of nT and low period of mT (n and m are an integer).

The above embodiment uses an output transformer with two output windings, however, an output transformer with a number of output windings may be used instead.

Figure 20:
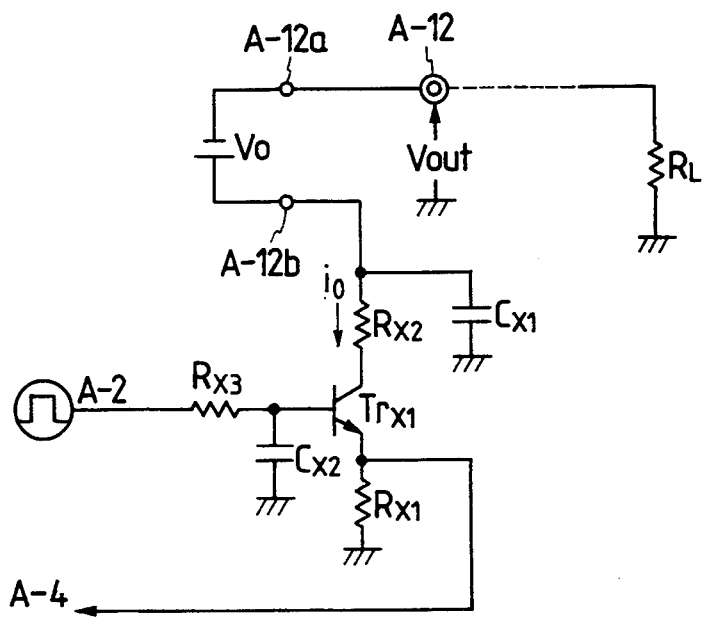
FIG. 20 is an equivalent circuit of the main part of the power source shown in FIG. 19.

The A-1 output is stabilized as in the following. The voltages appearing at the lower potential side A-12b and higher potential side S-12a of the A-12 output winding follow the A-11 output because the A-11 output is fed back to the primary winding of the transformer A-10. Assuming that the A-11 output is in a steady state, the voltage across the A-12a and A-12b sides take a certain constant voltage V0. An equivalent circuit of the main circuit portion for the A-12 output can be represented as shown in FIG. 20. In FIG. 20, the A-12 output voltage is represented by Vout, and the load impedance is represented by R1.

With the circuit arrangement as above, the current passing through the load R1 all flows into the secondary winding of the transformer and into the transistor Trx1. Therefore, the A-4 voltage signal becomes proportional to the current passing through the load R1. The voltage signal is fed back and compared with the reference value to form the pulse train of A-2 signal. Therefore, this embodiment performs a constant current operation.

The A-2 pulse train is converted into a DC voltage by the low-pass filter constructed of the resistor Rx3 and capacitor Cx2. The current passing through the load R1 is given by $$i0 = (Vd - V_{BE})/Rx1$$

where Vd represents the DC voltage, and the transistor Trx1 is assumed an ideal transistor.

Figure 21:
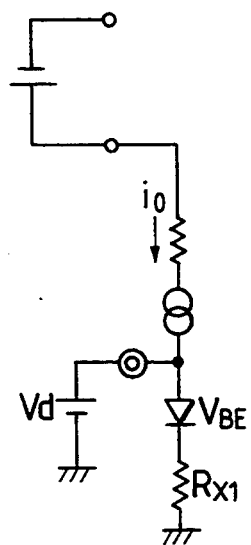
FIG. 21 is a conceptual view of a sub PWM circuit.

As described above, the transistor Trx1 of this embodiment carries out the similar operation as a usual series regulator. The conceptual view of such operation is given in FIG. 21.

Ripple components not removed by the low-pass filter are present in practice on the voltage Vd so that the current i0 contains ripple current components. The ripple current components are smoothed by the filter constructed of the resistor Rx2 and capacitor Cx1 to obtain a stable output.

In the above embodiment, if the ripple components in the output are to be reduced further, the time constant of the low-pass filter is made large. However, the response to rapid output change or the like is delayed.

Figure 22:
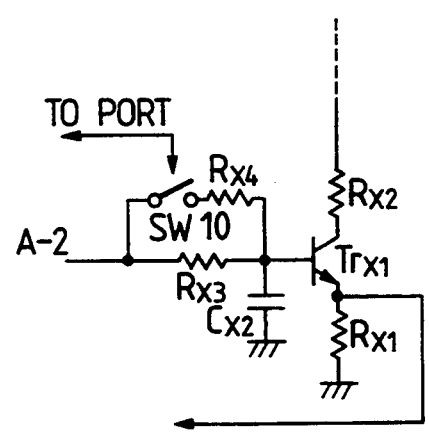
FIG. 22 is a circuit diagram showing a modification of the sub PWM circuit.

To deal with such a case, as shown in FIG. 22, an analog switch SW10 and resistor Rx4 are provided in parallel with the filter resistor Rx3, where Rx3 is considerably larger than Rx4. In order to attain a rapid response, the analog switch SW10 is turned on to change the output rapidly and thereafter, the analog switch SW10 is turned off to make the time constant large and obtain an output with small ripple components. Turning on and off the analog switch SW10 can be realized with one bit port without substantial increase of cost.

In the above embodiment of the sub PWM circuit, the constant current operation has been controlled using a feedback signal proportional to the output current. A constant voltage operation is also applicable by using a feedback signal proportional to the output voltage.

Figure 23:
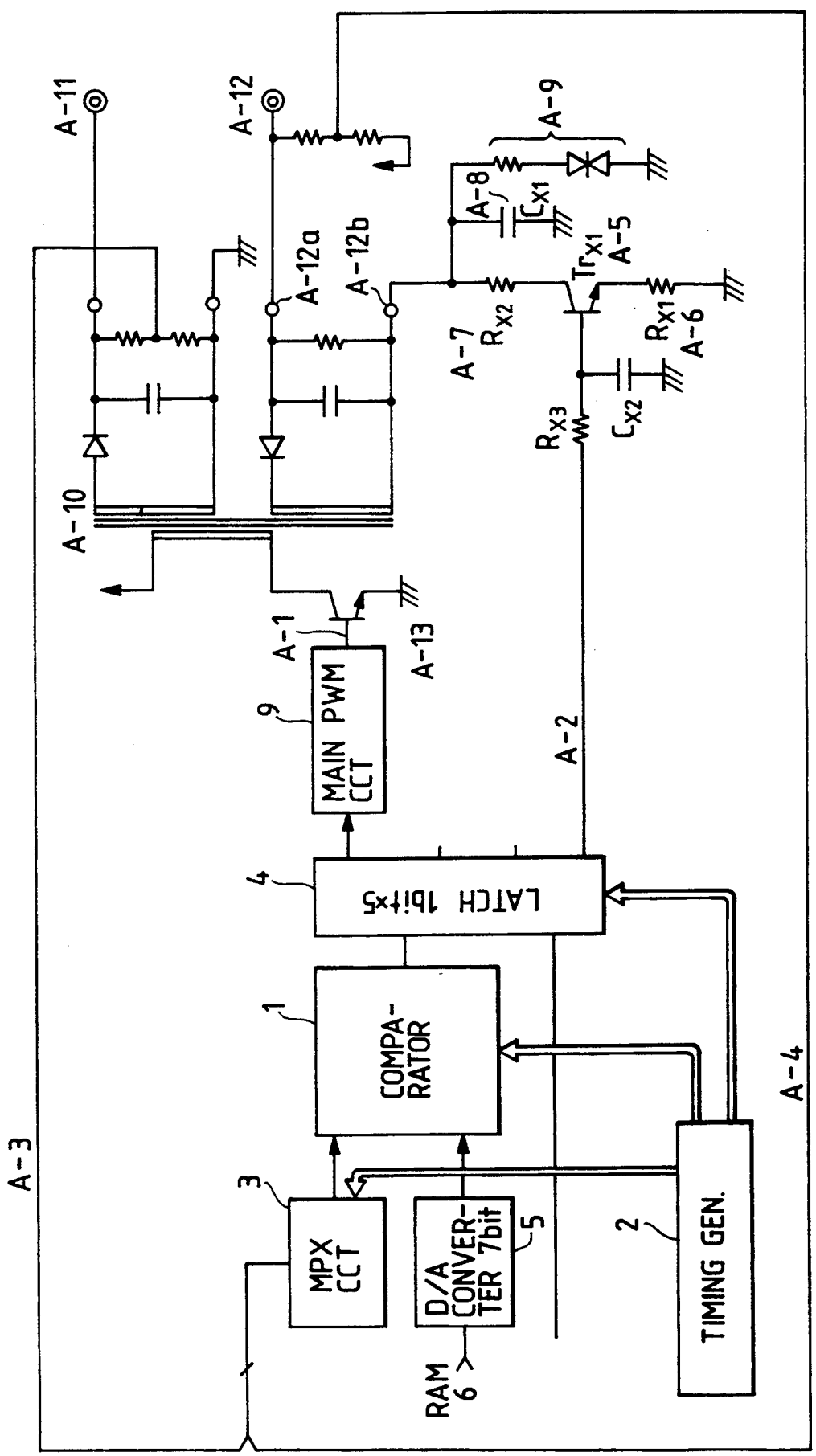
FIG. 23 is a block diagram showing a power source using a PWM circuit for conduction constant voltage control.

An exemplary circuit for such constant voltage operation is shown in FIG. 23. This circuit is the same as that shown in FIG. 15 except that the A-2 output from the latch 4 is supplied to the transistor Trx1 via the low-pass filter constructed of the resistor Rx3 and capacitor Cx2, so that the description therefor is omitted.

Figure 24:
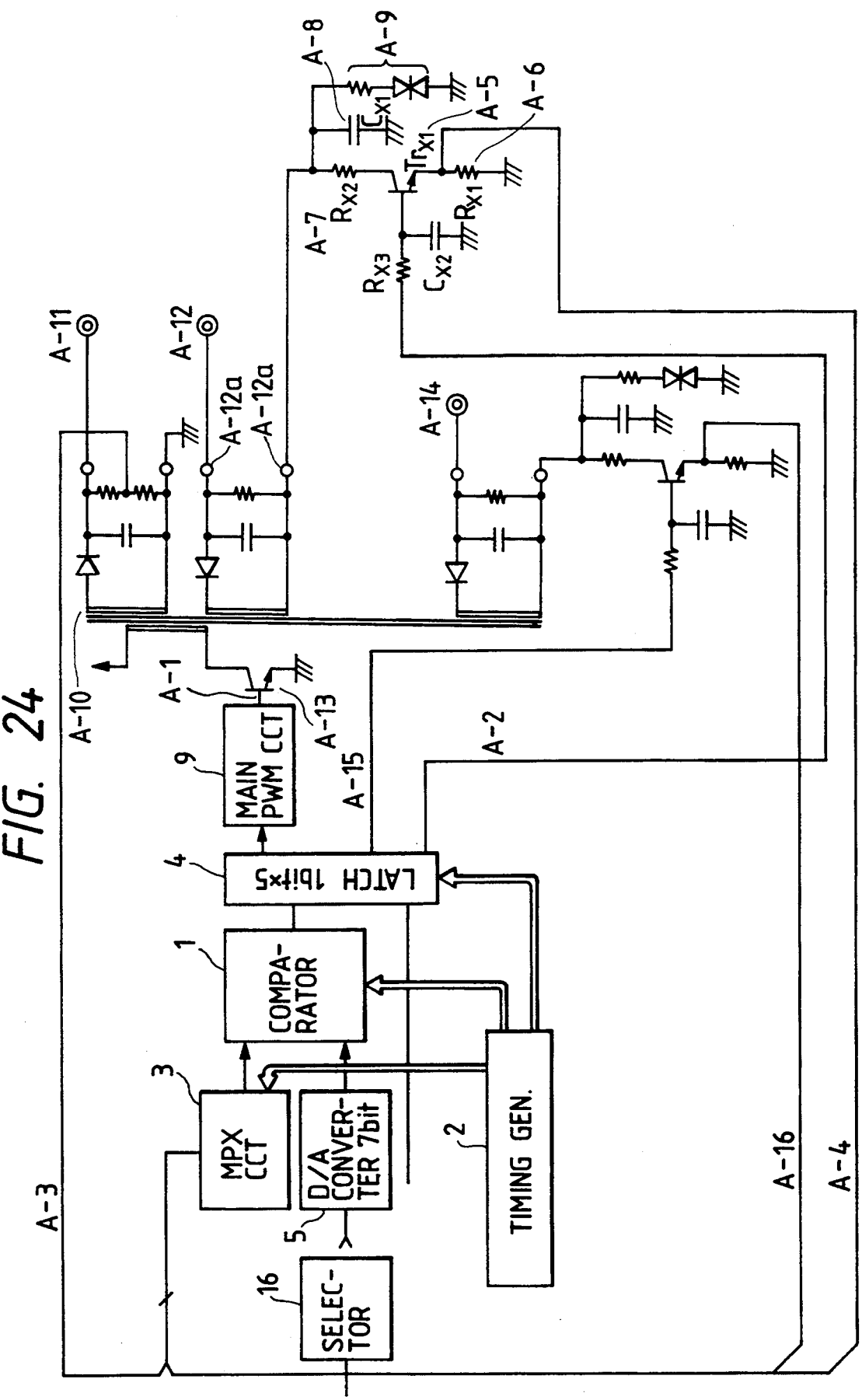
FIG. 24 is a block diagram showing a power source using two sub PWM circuits and a main PWM circuit.

The block diagram show in FIG. 24 uses another PWM circuit (SUB 1) in addition to the sub PWM circuit (SUB 0) shown in FIG. 23. The operation of this circuit will be described next.

In this embodiment, as the comparator 1, an ordinary analog comparator is used for the purpose of circuit simplicity. Upon reception of a signal from the timing generator 2, the MPX circuit 3 selects the A-3 input and supplies it to one input terminal of the comparator 1. At the same time, a selector 16 selects a latch 16 to read therefrom data which in turn are inputted to the D/A converter 5. The D/A converter 5 converts the inputted voltage into the corresponding analog voltage which is supplied to the other input terminal of the comparator 1. The comparator 1, as described previously, compares the output from the MPX circuit with the output from the D/A converter 5, and outputs a high or low level signal depending upon the difference therebetween. The high or low level signal is then latched at the latch 4 at the bit corresponding to the main PWM circuit 9 upon reception of the latch signal from the timing generator 2 at that time. An output from the latch 4 is inputted to the main PWM circuit 9 at the up/down terminal of the up/down counter. Therefore, the pulse width modulated output A-1 from the main PWM circuit 9 drives the main transistor A-13 to control the A-11 output to a constant voltage. The above description is for the main PWM circuit operation.

Next, upon reception of a signal from the timing generator 2, the MPX circuit 3 selects the A-4 input and supplies it to the one input terminal of the comparator 1. At the same time, the selector 16 selects RAM 6 to read therefrom the set value of the A-12 output at the corresponding address. The set value is inputted to the D/A converter 5 which in turn converts it into an analog voltage and supplies it to the other input terminal of the comparator 1.

In the same manner as described previously, the comparator 1 compares the two input signals, generates a high or low level signal depending upon the difference therebetween, and supplies it to the latch 4 at a bit corresponding to the A-2 output in response to an output from the timing generator 2. The A-2 output drives the transistor A-5 via the resistor and capacitor Cx2 to perform the operation to be described later. The above description is for the operation of the sub PWM circuit.

Next, the operation for the main PWM circuit is carried out.

Upon further reception of a signal from the timing generator 2, the MPX circuit 3 selects the A-16 input and supplies it to one input terminal of the comparator 1. At the same time, the selector 16 selects RAM 6 to read therefrom the set value of the A-14 output at the corresponding address. The set value is inputted to the D/A converter 5 which in turn converts it into an analog voltage and supplies it to the other input terminal of the comparator 1. The comparator 1 compares the two input signals, generates a high or low level signal, and supplies it to the latch 4 at a bit corresponding to the A-15 output in response to an output from the timing generator 2. The A-15 output performs the similar operation of the SUB 0 to be described later. The above description is for the operation of the sub PWM circuit SUB 1.

Next, the operation of the main PWM circuit is carried out, and thereafter the A/D conversion operation as described with the first embodiment is carried out. The above operations are repeated as a one operation cycle.

Figure 25:
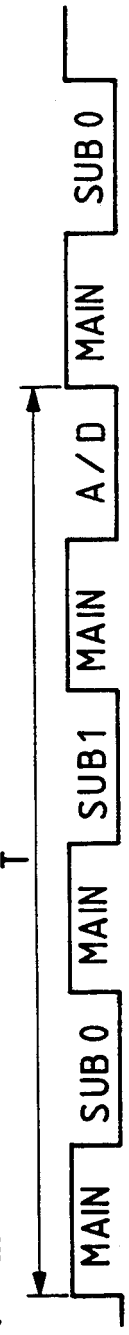
FIG. 25 is a timing chart of a timing generator.

FIG. 25 is a timing chart illustrating the operation of this embodiment. As described above, the operations of main PWM circuit, SUB 0, main PWM circuit, SUB 1, main PWM circuit and A/D are repeated as one operation cycle T. Based on the comparison result of the set value with the output signal, the sub PWM circuit (SUB 0, SUB 1) outputs at each operation cycle T a pulse train of high and low signals, the pulse train being composed of a high period of nT and a low period of mT (n and m are an integer).

FIG. 26 is a block diagram showing the overall circuit arrangement of the controller made of a single chip on which integrated together are digital circuits including a microcomputer (microprocessor), peripheral memories, timers and the like, the above-described main PWM circuit, and three sub PWM circuits. Most of the operations for sequential controlling a copying machine and printer, and for controlling power sources can be conducted with this single chip.

According to the circuit arrangement of this integrated circuit, at the periphery of a CPU core unit 31 including data/program memories, interrupt control circuit and the like, there are provided a reset block 32 including a stand-by function at a low voltage, a watch dog timer 33 for checking program runaway, a D/A converter 5 for converting digital data into analog data under control of CPU, an A/D converter block functioning as an analog digital converter by the D/A converter 5 and comparator 1, and a D/A-A/D controller 36 for controlling the operation timings of the D/A converter and the A/D converter block.

The A/D converter block includes therein a multiplexer (MPX) circuit 3 which selects one of a plurality of analog signals to be A/D converted, at the timings given by the D/A-A/D controller 36.

A/D conversion is used in reading various voltages at rheostats for a fixing thermistor, copy density and the like of the copying machine. The D/A converter is used for controlling the light quantity of the fluorescent lamp of the copying machine, and for obtaining a reference voltage of the comparator 1 of the PWM circuit for high voltage control and the like.

A drive pulse generator for developing AC bias includes a 4 bit frequency divider 35 for dividing CPU internal clocks, and a ½ frequency divider 34 for making the developing AC bias drive pulse have a duty of 50%.

PWM circuits 9, 13, 14 and 15 are used for controlling a low voltage power source, high voltage power source, and light quantity of a fluorescent lamp, respectively. In controlling the low voltage power source, the PWM circuit 9 of digital 7 bit configuration is used. The other PWM circuits 13 to 15 are sub PWM circuits each of which is constructed such that the output from the comparator is directly used as the PWM circuit output. The main PWM circuit for controlling the low voltage power source has a function to shut down a PWM output immediately upon detection of an abnormal state of the power source. The input for the main PWM circuit is constructed of a comparator 38 such that when a value in excess of a predetermined value is supplied, and the PWM output is immediately turned off to thus protect the associated circuitry and enhance the safe operation of the copying machine.

The integrated circuit is provided with other input port 42 and output ports 41 and 39. The input port 42 is used for inputting detected values from various sensors, and switch information such as copy start, copy number and the like from an operation console. The output port 41 is used for control of a motor, heater, solenoid and the like. The output port 39 is used for driving display LEDs.

A checker for checking the operation of the copying machine at a factory, or market is adapted to be connected to the main frame of the apparatus via a serial communication port 40.

In FIG. 26, the D/A-A/D controller 36 includes the timing generator 2, RAM 6, selector 7, arithmetic operation unit 8, and registers 10 to 12, respectively shown in FIG. 11. CPU sets data at respective blocks in the manner as described hereinafter so as to control the outputs from the main PWM circuit and sub PWM circuits.

The registers A, B and C 10 to 12 shown in FIG. 11, and 4 bit registers 25 and 26 shown in FIG. 14 are independently assigned addresses if a memory mapped I/O is used, and port numbers if a port I/O is used.

Since the 4 bit registers 25 and 26 shown in FIG. 14 can be set independently, CPU addresses each register to set a predetermined value and hence parameters defining the operation of the main PWM circuit. A RAM for storing D/A converted values, i.e., set values for the main and sub PWM circuits, and A/D converted data may be constructed of shift registers. Data transfer between RAM and CPU is carried out in the following manner.

Figure 27:
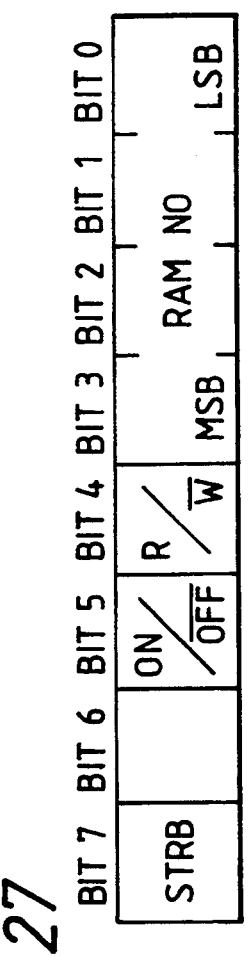
FIG. 27 shows the configuration of register bits.

First, referring to the bit configuration of register C shown in FIG. 27, Bits 0 to 3 designate the number of RAM 6 or the number of MPX circuit 3 shown in FIG. 11. Bit 4 designates a Read or $\overline{\text{Write}}$. When designating the Read, one of the inputs to the 8 channel MPX circuit 3 to be A/D converted is indicated by using the number (bits 0 to 3) of RAM 6, which number is stored in a latch within the timing generator 2. When designating the $\overline{\text{Write}}$, the address of RAM 6 is indicated by using the number (bits 0 to 3) of RAM 6. Bit 5 designates if the outputs from the main and sub PWM circuits are to be outputted or not. Bit 7 designates the timing signal for communication between CPU and timing generator. For example, if bit 7 is changed from 0 to 1, the data of bits 0 to 5 and the data of the register A10 become valid. In the above bit configuration, four bits from bits 0 to 3 are assigned as the number of RAM 6. However, RAM 6 of this invention is constructed of five shift registers and used for 8 channel external inputs so that 3 bits may suffice.

An output value from each PWM circuit is set in RAM 6 in the following manner. CPU first addresses register A10 to write therein the data corresponding to the output to be set. Next, the register C is addressed to write at the bits 0 to 3 the number of RAM 6 to be set. For example, for the main PWM circuit, a value 0 is set, and for the sub PWM circuit 0, a value 1 is set. In addition, by setting the bit 4 in the $\overline{\text{Write}}$ state, bit 7 is changed from 0 to 1. RAM 6 is constructed of shift registers in this embodiment as described previously. Therefore, the timing generator 2 operates while referring to the number of RAM 6 in the register C12, in such a manner that simultaneously with an output of the number of RAM 6 to D/A converter 5, the selector which ordinarily selects the arithmetic operation unit 8 is turned to the register A side to thus write the data of register A into RAM 6 upon generation of the next shift clock. After completion of the shift clock, the selector 7 again selects the data from the arithmetic operation unit 8 which delivers the output from RAM 6 directly to the selector 7.

The above operations enable setting of the set value of each PWM circuit output. In order to set the address for A/D conversion, CPU addresses the register C to write into the bits 0 to 3 (actually bits 0 to 2) the channel number (0 to 7) to be A/D converted. In addition, by setting bit 4 at the Read and by changing bit 7 from 0 to 1, the value of bits 0 to 3 of the register C are set at a latch within the timing generator 2 which in turn supplies the channel number latched in the latch to the MPX circuit 3 at the timing when A/D conversion is carried out. In this case, the arithmetic operation unit 8 causes the bit data which is determined based upon the comparison result to set at 1 or 0. The set bit data is sent to the selector 7. The arithmetic operation unit 8 sets 1 sequentially from the most significant bit to thus repeat the above-described comparison operation and update the data in RAM 6 until the least significant bit is established. When the least significant bit is established, the timing generator 2 gives a latch pulse to the register B to thus store the data as the A/D converted data. Thereafter, in order for the arithmetic operation unit 8 to again perform the comparison operation, only the most significant bit is set with 1 while the other bits are set with 0, these bit values being written in RAM 6 via the selector 7. The CPU knows the A/D converted value by addressing the register C and reading it therefrom.

As described in the foregoing, a pulse width modulated, stabilized power source can be realized using a simple circuit arrangement. The power source can be integrated on the same chip on which the other control circuits for the image forming apparatus are integrated, resulting small chip area and a low cost of the apparatus.

Figure 28:
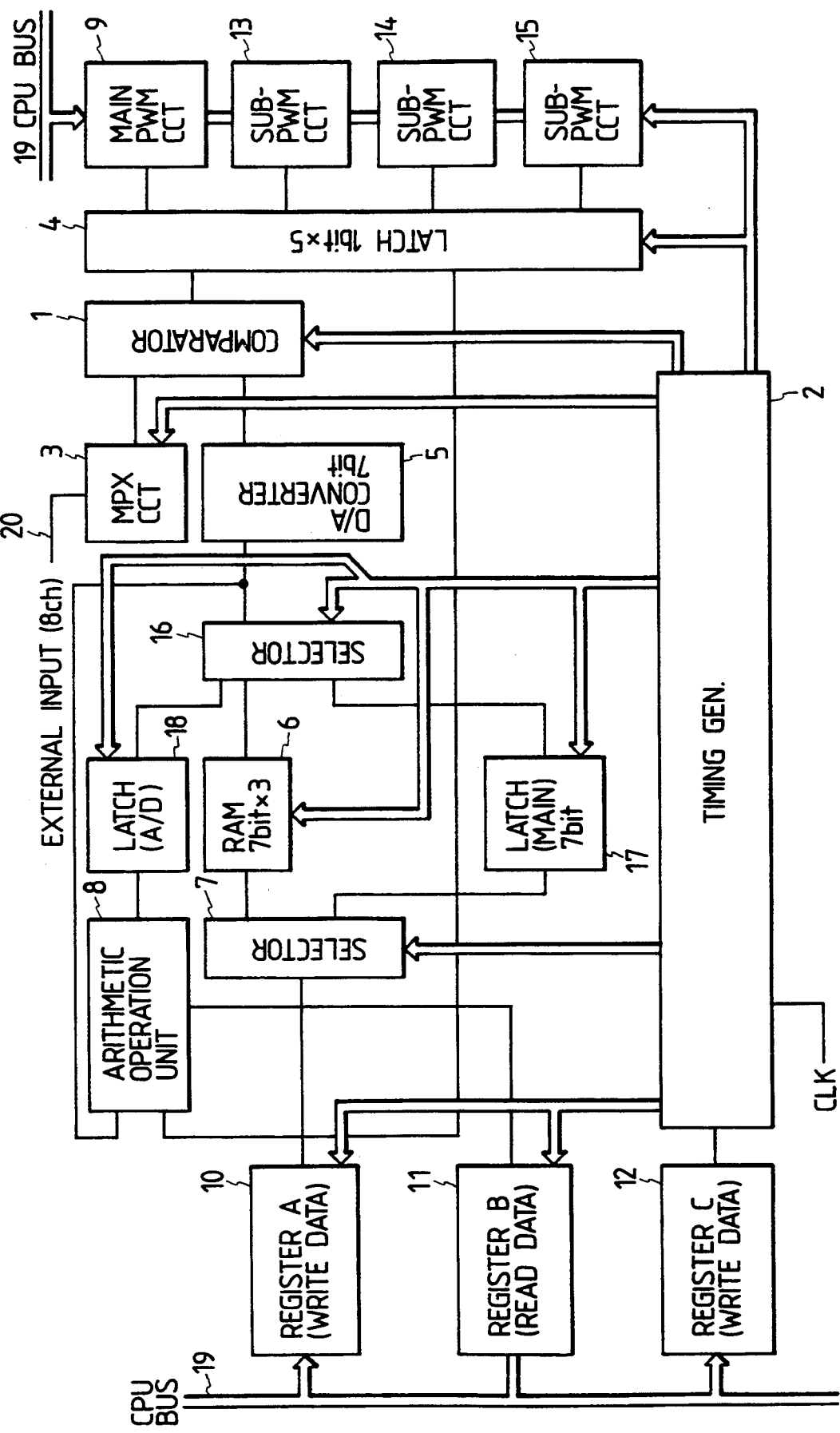
FIG. 28 is a block diagram showing a modification of the A/D - D/A controller using a PWM circuit.

FIG. 28 is a block diagram showing still a further embodiment of this invention.

Figure 29:
FIGS. 29 and 30 are timing charts of a timing generator.

This embodiment allows high speed A/D conversion. FIG. 29 is a timing chart illustrating an exemplary operation of the embodiment. In this embodiment, the conversion time is 3.5 T for the case of 7 bit resolution, whereas the embodiment shown in FIG. 25 requires 7 T.

Figure 30:

If a higher speed A/D conversion is necessary, the embodiment operates in the manner as illustrated by the timing chart shown in FIG. 30, resulting in a conversion time of 7/4 T', i.e., 7/3 T.

An another embodiment of this invention will be described. In this embodiment, A comparator, up/down counter and digital comparator as well as CPU, ROM, RAM, timer and system clock generator are fabricated on the same chip. Further, as the reference value to be compared at the comparator, analog data stored in ROM are used, or analog data stored in RAM after subjected to CPU arithmetic operation are used. As the set value to be compared at the digital comparator, data stored in ROM or data stored in RAM after subjected to CPU arithmetic operation. Then, the up/down counter and counter are driven by clocks from the system clock generator or by its divided clocks. The predetermined value counted by the up/down counter is set in accordance with the data stored in ROM or data stored in RAM after CPU arithmetic operation. Thus, the output from the digital comparator is controlled to a constant value.

Figure 31:
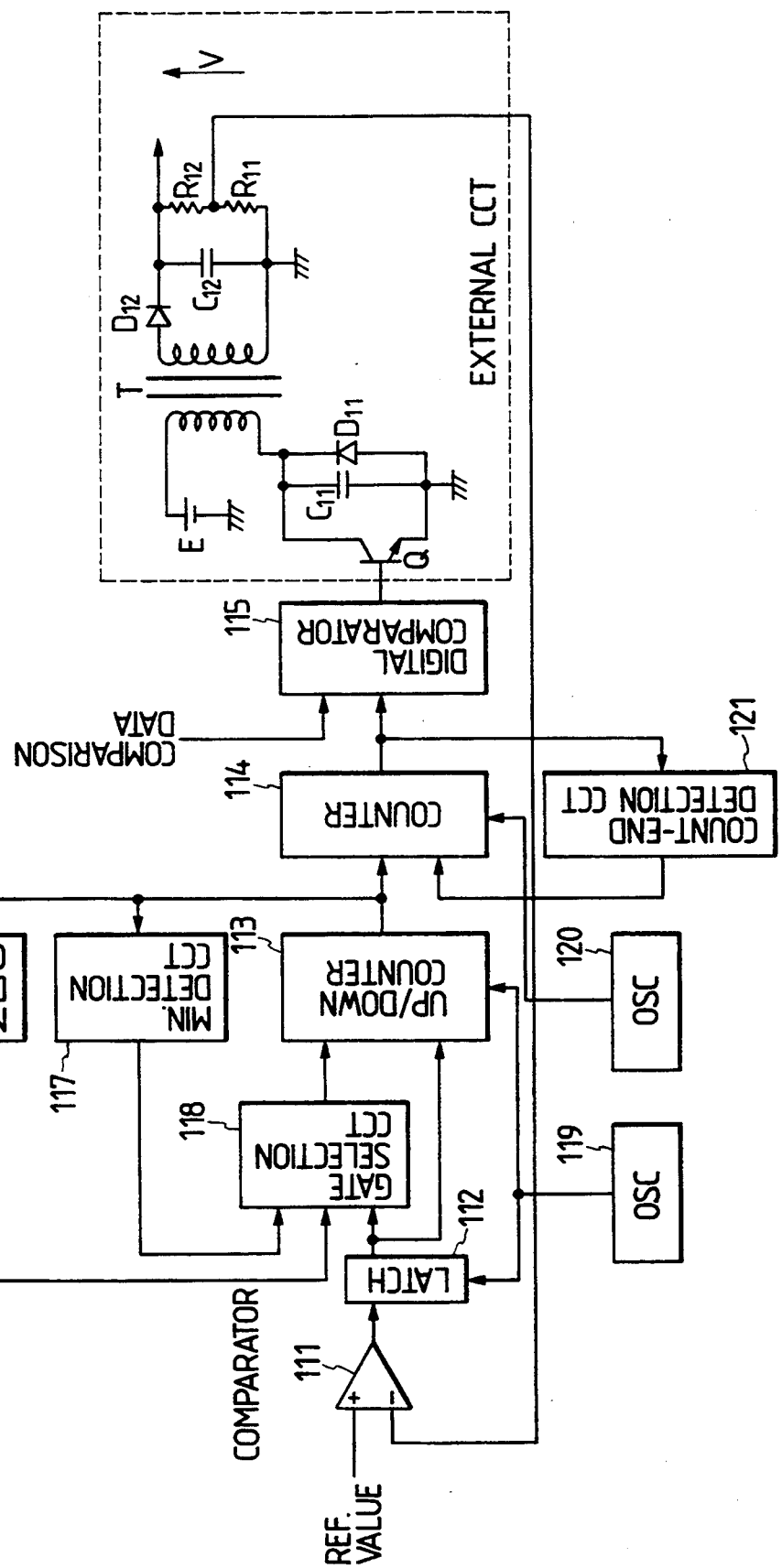
FIG. 31 is a block diagram showing a modification of a power source using a PWM circuit.

FIG. 31 is a circuit diagram showing the above-described embodiment. In FIG. 31, A comparator 111 compares the output value from an external power source transformer T with the reference value. A latch 112 latches an output from the comparator 111. An up/down counter 113 changes its count within a predetermined range in accordance with an output from latch 112. A counter 115 counts the output from the up/down counter 113. A digital comparator 115 compares the count value of the counter 114 with a set value. A maximum count detection circuit 116 detects a maximum count of the up/down counter 113. A minimum count detection circuit 117 detects a minimum count of the up/down counter 113. A gate selection circuit 118 selects one of the outputs from the detection circuits 116 and 117 and latch 112 for control of the gate of the up/down counter 113. Oscillators 119 and 120 are each constructed of an oscillation element such as a crystal. A count end detection circuit detects the end of count operation by the counter 114. E represents a DC supply to a transformer T, and Q represents a switching element which is PWM controlled by an output from the digital comparator 115. Switching operation of the element Q causes generation of an output voltage V. In the Figure, R11 and R12 represent a resistor, D11 and D12 represent a diode, and C11 and C12 represent a capacitor.

The operation of the above embodiment will now be described.

An AC output obtained from the transformer T is rectified by the diode D12 and smoothed by the capacitor C12. The smoothed DC output is divided by the resistors R11 and R12, and then compared with a reference value at the comparator 111. An output from the comparator 111 is latched at the latch 112. The up/down counter 113 counts up when the output from the latch 112 is a high level, and counts down when it is a low level. The gate selection circuit 118 operates to close the count gate for the up/down counter 113 and stop its operation on condition that a maximum count is detected with the maximum count detection circuit 116 and the output from the latch 112 is a high level, and on condition that a minimum count is detected with the minimum count detection circuit 117 and the output from the latch 112 is a low level. In this condition, the oscillator 119 supplies drive clocks for the latch 112 and up/down counter 113.

Specifically, when the voltage V across the capacitor C12 is small, the output from the up/down counter 113 is counted up at the timings from the oscillator 119 and stops its count operation when the count reaches the upper limit (upon detection of the maximum count). Alternatively, when the voltage V is large, the output from the up/down count 113 is counted down at the timings from the oscillator 119 and stops its count operation when the count reaches the lower limit (upon detection of the minimum value). In accordance with the comparison result of the voltage V with the reference value, the count value of the up/down counter 113 decreases or increases.

The counter 114 counts down clocks from the oscillator 120. Upon detection by the count end detection circuit 121 that the value of the counter 114 is 0, the count value of the up/down counter 113 is read at that timing from the counter 114, and outputted to the digital comparator 115. The digital comparator 115 compares the data from the counter 114 with the predetermined data, and outputs the comparison result to the base of the switching element Q. The switching element Q is driven by a PWM signal having a constant off-time duration. Switching operation of the element Q thus allows to supply a predetermined power from the secondary winding of the transformer T.

Specifically, the counter 114 and digital comparator 115 generates a PWM signal, while the up/down counter 113 changes the width (duty ratio) of the PWM signal. Further, the output from the comparator 111 changes the count value of the up/down counter 113, to thus control the output voltage V to a constant value.

Figure 32:
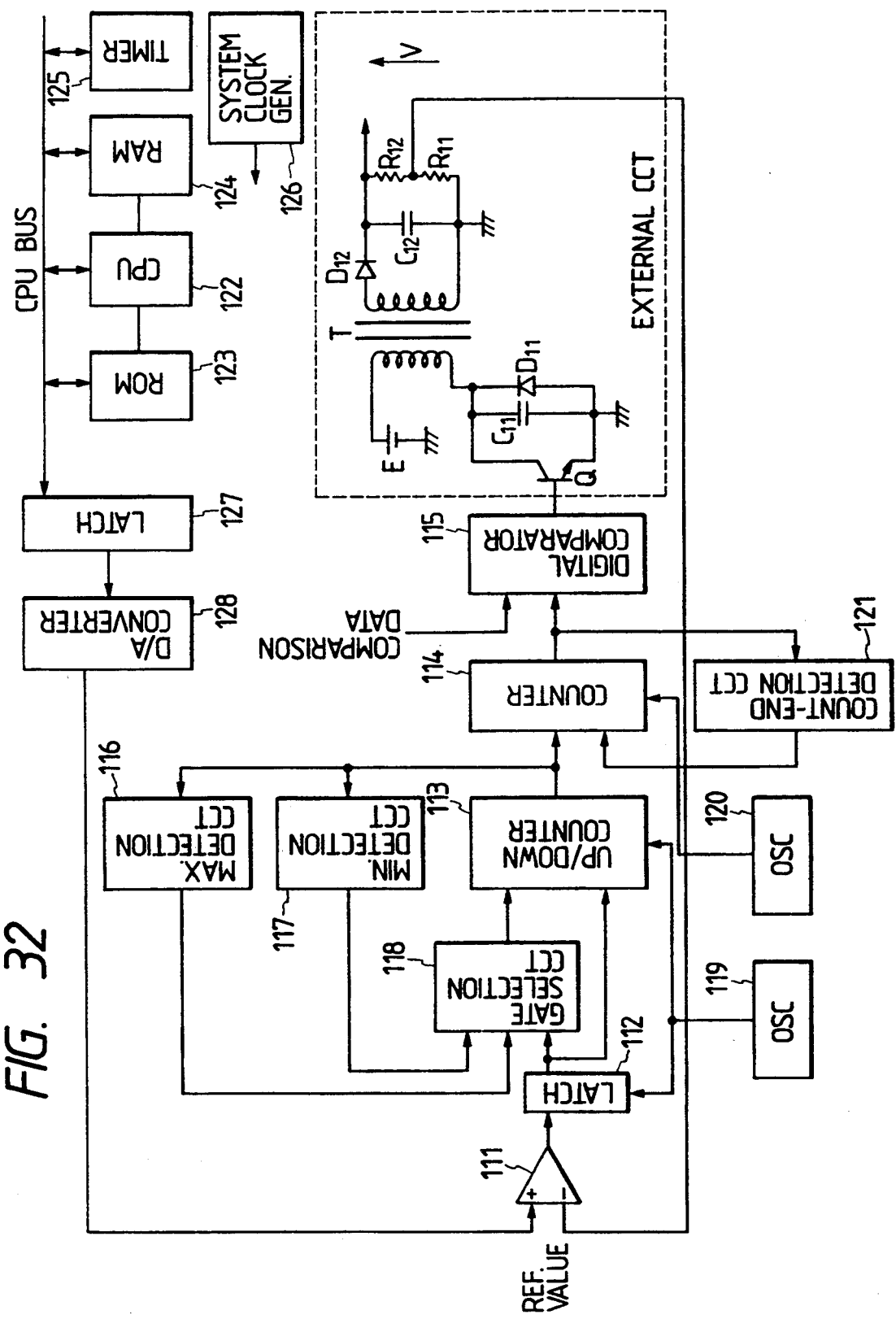
FIG. 32 is a block diagram showing another modification of a power source using a PWM circuit.

FIG. 32 is a block diagram of the circuit shown in FIG. 31 which is fabricated on the same chip together with CPU, ROM, RAM and other circuit elements. This circuit integrated on the same chip includes a CPU 122, ROM 123, RAM 124, timer 125 controlled by CPU 122, system clock generator 126, latch 127, D/A converter 128 for D/A converting the output data from the latch 127, as well as the comparator 111, up/down counter 113, counter 114, digital comparator 115 and other circuit elements.

ROM 123 stores programs necessary for running CPU 122 and other data. Data obtained through CPU 122 arithmetic operations are stored in RAM 124. CPU 122 transfers data on ROM 123 or RAM 124 to the latch 127. An output from the latch 127 is D/A converted at the D/A converter 128, and thereafter supplied to the comparator 111 as its reference voltage. CPU 122 sets the reference voltage of the comparator 111 to set the output voltage value V as desired. Under control of CPU 122, the output from the D/A converter can be made near to the target set value at each predetermined timing from a timer, to thus allow a soft start function.

Figure 33:
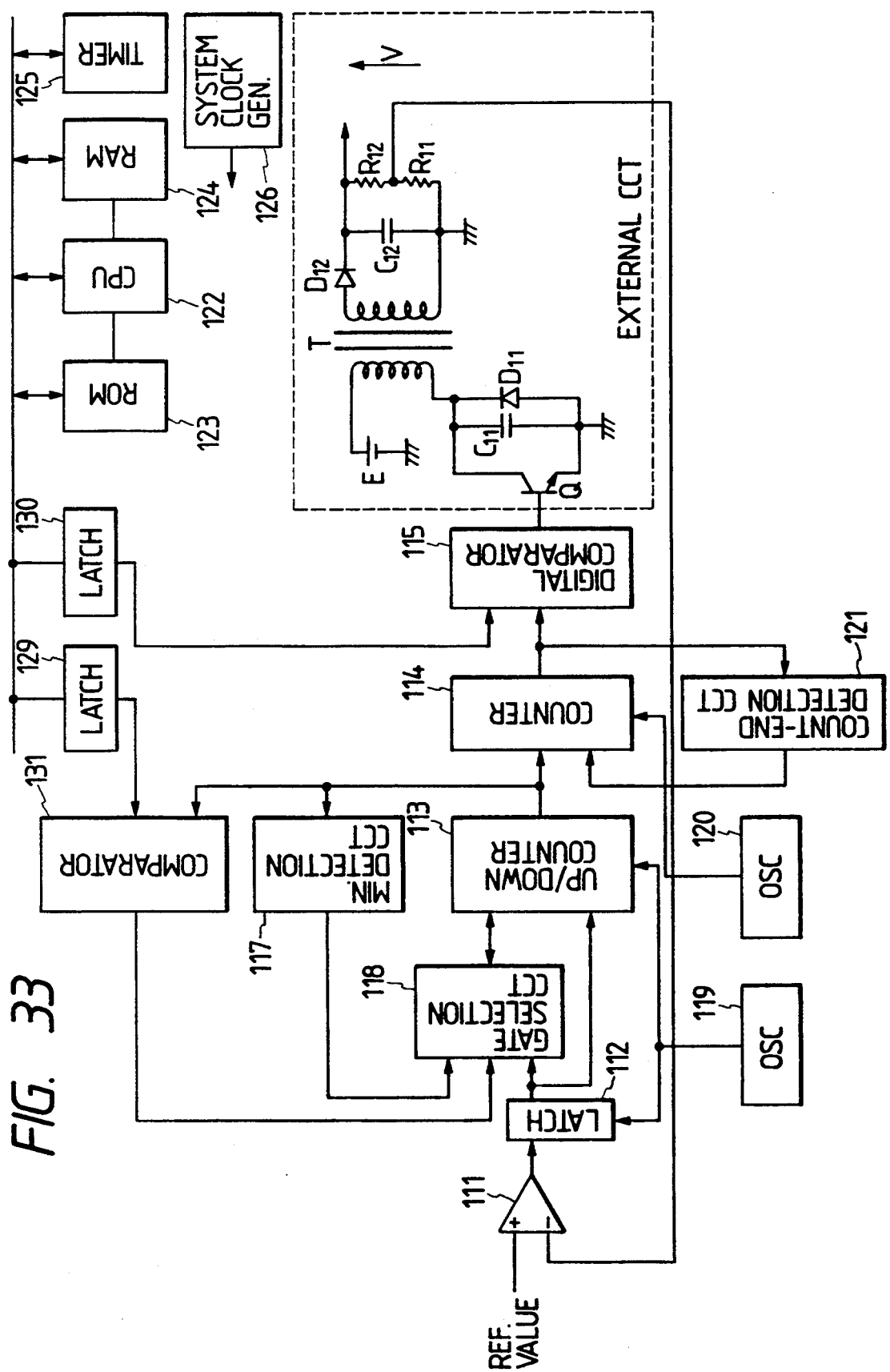
FIG. 33 is a block diagram showing a further modification of a power source using a PWM circuit.

FIG. 33 is a block diagram showing a further embodiment of this invention. In the FIG. 33, latches 129 and 130 are connected to a CPU bus, and a comparator 131 compares the data from the latch 129 with the data from the up/down counter 113. CPU 122 transfers data on ROM 123 or RAM 124 to the latch 130. The comparator 115 compares together the data from the latch 130 and counter 114, and outputs the comparison result as a PWM output. The data from the latch determines the off-time of the switching element Q. Namely, CPU 122 can set an optimum off-time which depends on the components of transformer T, capacitor C11 and the like. CPU 122 sends a maximum value to the comparator 130 via the CPU bus and latch 130 to thus always maintain the switching element Q to be turned off. At the same time, CPU 122 transfers the data on ROM 123 or RAM 124 to the latch 129. The comparator 131 compares the data from the latch 129 with the data from the up/down counter 113. If the data from the up/down counter 113 is equal to or larger than the data from the latch 129, then the up/down counter 113 is inhibited to operate by means of the gate selection circuit 118. The comparator 131 may use a coincidence circuit. The upper limit of the up/down counter 113 can be set with the data sent from the latch 129 under control of CPU 122, and the maximum value of the on-time of the comparator 115 can be set by CPU 122. Therefore, a danger of a possible destruction of the circuit due to an excessively large on-time can be eliminated. Further, an excessive output voltage V can be avoided. Furthermore, by making the data to the comparator 131 near to the set value at each predetermined timing under control of CPU 122, a soft start function can be provided.

Figure 34:
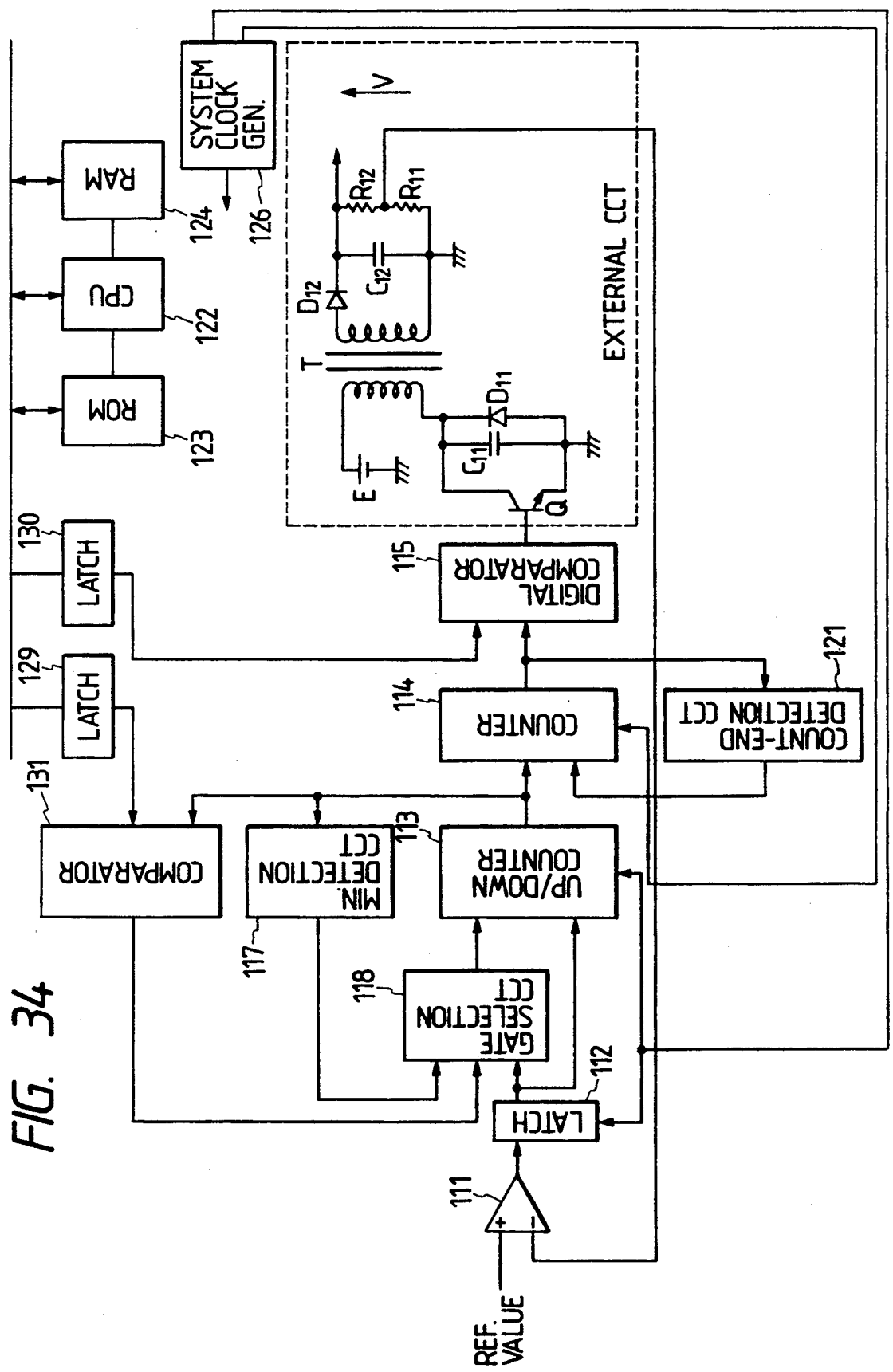
FIG. 34 is a block diagram showing a still further modification of a power source using a PWM circuit.

FIG. 34 is a block diagram of still a further embodiment of this invention. In this embodiment, clocks for use with the latch 112, up/down counter 113 and counter 114 are the clocks from the system clock generator 126 or the clocks obtained through division thereof. Therefore, an additional oscillator dedicated for that purpose is not needed so that noises and malfunctions caused by clocks can be reduced. In addition, synchronization of data transfer by CPU 122 is possible, thus avoiding abnormal count operation.

As appreciated from the foregoing description of the embodiment of the controller of this invention, the following advantageous effects can be obtained as compared with the conventional apparatus.

(a) Since the PWM control circuit is realized using a counter, the circuit is resistant against noises and has high precision of frequency and maximum duty.

(b) Variation of frequency and maximum duty is small.

(c) Frequency and duty ratio can be set using digital data.

(d) Highly resistant against power fluctuation.

(e) There is no need of an error amplifier and A/D converter, and the circuit can be realized using a comparator, thus improving control precision.

(f) Gate arrays and the like can be fabricated as a digital IC, and they are formed on the same chip as of a microcomputer.

Figure 35:
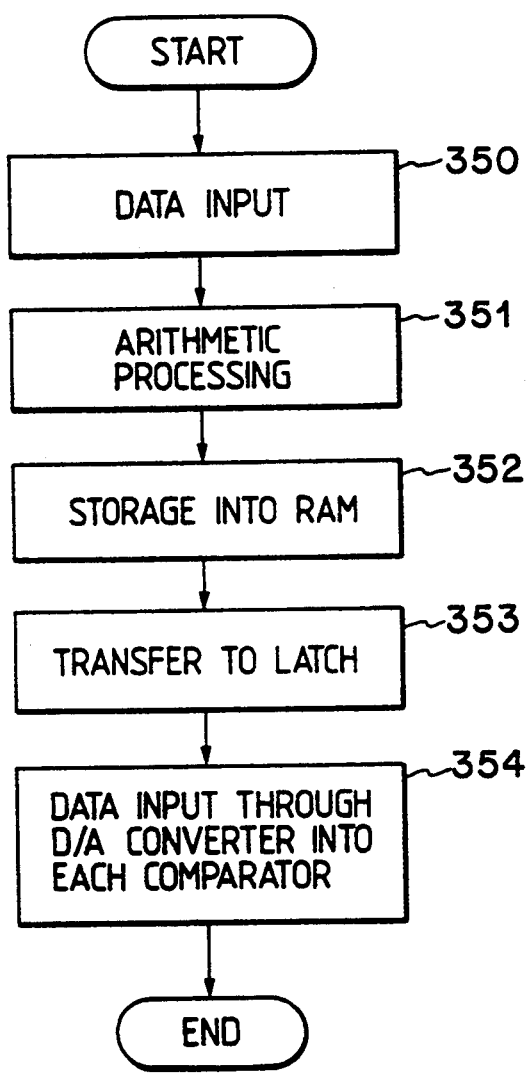
FIG. 35 is a flow chart illustrating the data input operation by CPU.
Figure 36:
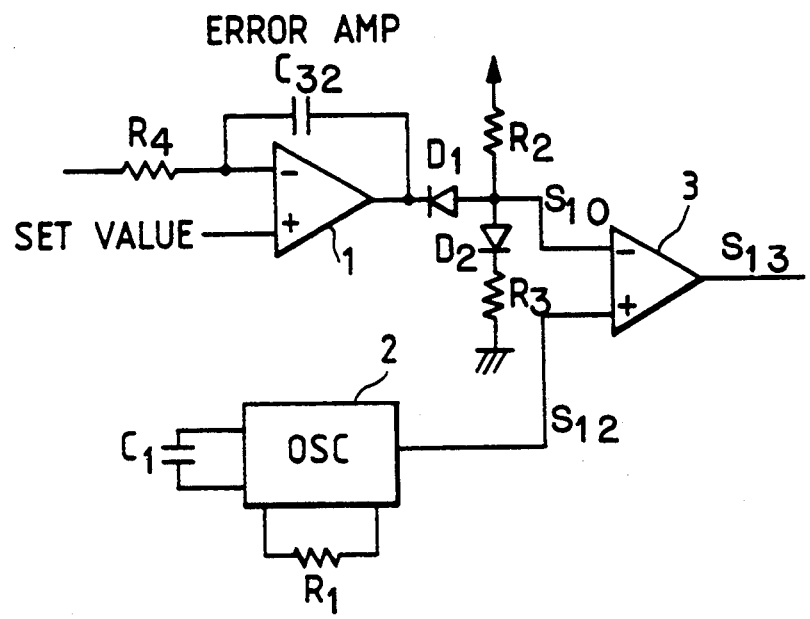
FIG. 36 is a circuit diagram showing the main part of a conventional PWM controller unit.
Figure 37:
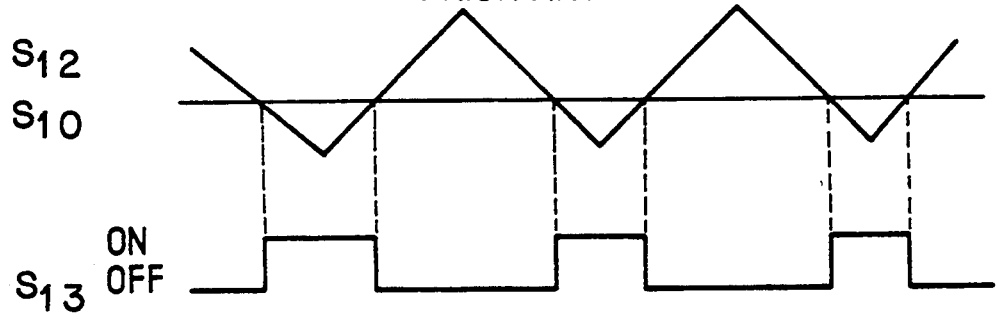
FIG. 37 shows output waveforms at various portions of the circuit shown in FIG. 36.

FIG. 35 is a flow chart illustrating the data input operation by CPU 122 of the embodiment shown in FIG. 33. As described previously, upon input of various data including detected values (step 350), CPU 122 performs an arithmetic operation therefor (step 351). The processing result is stored in RAM 124 (step 352). The data stored in RAM 124 or in ROM 123 are transferred to each latch (step 353), subjected to D/A conversion, and supplied to the comparator 111 or digital comparator 115 (step 354) as the data to be compared.

The present invention is not intended to be limited to the above embodiments only, but various modifications and applications are possible within the scope of the appended claims.

We claim:

1. A controller, comprising:
   an analog circuit for controlling a power source to generate power for an apparatus, said analog circuit including a comparator for comparing an output of said power source with a reference signal so as to output a pulse width modulated signal for controlling said power source;
   a digital circuit connected to said analog circuit, said digital circuit including a CPU for performing process steps to control said apparatus and for performing process steps to control said analog circuit; and
   a chip on which said analog circuit and said digital circuit are integrally formed,
   wherein said analog circuit causes an input of either said reference signal or a signal corresponding to the output from said power source, to said comparator.

2. A controller according to claim 1, wherein said apparatus is an image forming apparatus.

3. A controller according to claim 2, wherein the image forming apparatus is an electrophotographic image forming apparatus.

4. A controller, comprising:

an analog circuit for controlling a power source to generate power for an apparatus, said analog circuit including a comparator for comparing an output of said power source with a reference signal so as to output a pulse width modulated signal for controlling said power source;

a digital circuit connected to said analog circuit, said digital circuit including a CPU for performing process steps to control said apparatus and for performing process steps to control said analog circuit; and a chip on which said analog circuit and said digital circuit are integrally formed, wherein said analog circuit further includes a modulation circuit for modulating the output from said comparator at a predetermined frequency and outputting the modulated signal outside of said chip.

5. A controller according to claim 4, wherein said comparator includes an inverter, a capacitor connected serially to said inverter at the input side of said inverter, and a switch circuit connected in parallel with said inverter.

6. A controller according to claim 5, wherein said CPU controls an open/close timing of said switch circuit.

7. A controller according to claim 4, wherein said analog circuit includes a switch circuit for selectively switching an input to said comparator, and said CPU controls an open/close timing of said switch circuit.

8. A controller according to claim 4, wherein said apparatus is an image forming apparatus.

9. A controller according to claim 8, wherein the image forming apparatus is an electrophotographic image forming apparatus.

10. A controller comprising:

an analog circuit for controlling a power source to generate power for an apparatus, said analog circuit including a comparator for comparing an output of said power source with a reference signal so as to output a pulse width modulated signal for controlling said power source;

a digital circuit connected to said analog circuit, said digital circuit including a CPU for performing process steps to control said apparatus and for performing process steps to control said analog circuit; and a chip on which said analog circuit and said digital circuit are integrally formed.

11. A controller according to claim 10, wherein said CPU further performs setting of a parameter of the pulse width modulated signal.

12. A controller comprising:

an analog circuit for controlling a power source to generate power for an apparatus, said analog circuit including a comparator for comparing an output of said power source with a reference signal to output a signal for controlling said power source;

a digital circuit connected to said analog circuit, said digital circuit including a CPU for performing process steps to control said apparatus and for performing process steps to control said analog circuit; and a chip on which said analog circuit and said digital circuit are integrally formed, wherein the signal from said analog circuit switchingly controls a transformer of said power source.

13. A controller according to claim 12, wherein said apparatus is an image forming apparatus.

14. A controller according to claim 13, wherein the image forming apparatus is an electrophotographic image forming apparatus.

15. A controller comprising:

an analog circuit for controlling a power source to generate power for an apparatus, said analog circuit including a comparator for comparing an output of said power source with a reference signal so as to output a signal for controlling said power source;

a digital circuit connected to said analog circuit, said digital circuit including a CPU for performing process steps to control said apparatus and for performing process steps to control said analog circuit; and a chip on which said analog circuit and said digital circuit are integrally formed, wherein said comparator further performs analog-to-digital conversion of an output of said power source.

16. A controller according to claim 15, wherein said CPU transmits an operation timing control signal to said comparator so as to control the operation of said comparator to perform either the power source control or an analog-to-digital conversion of the power source.

17. A controller according to claim 15, wherein said apparatus is an image forming apparatus.

18. A controller according to claim 17, wherein the image forming apparatus is an electrophotographic image forming apparatus.

* * * * *

UNITED STATES PATENT AND TRADEMARK OFFICE
CERTIFICATE OF CORRECTION

PATENT NO. : 5,414,862
DATED : May 9, 1995
INVENTOR(S) : Koji Suzuki, et al.

PAGE 1 OF 2

It is certified that error appears in the above-identified patent and that said Letters Patent is hereby corrected as shown below:

COLUMN 2

Line 17, "level S10" should read --level $S_{10}$--;
Line 19, "signal S12" should read --signal $S_{12}$--;
Line 20, "signal S12" should read --signal $S_{12}$--;
Line 21, "level S10" should read --level $S_{10}$--;
Line 23, "output S13" should read --output $S_{13}$--;
Line 26, "waveforms S10, S12" should read --waveforms $S_{10}$, $S_{12}$--;
Line 27, "S13." should read --$S_{13}$.--; and
Line 29, "signal S12" should read --signal $S_{12}$--.

COLUMN 8

Line 48, "supplied" should read --is supplied--.

COLUMN 12

Line 3, "$C_{Cx} = \frac{1}{Cx} \int \Delta(i_1(t_1 + t_2) - \frac{V_{Cx}}{R_{x2}} \cdot t_2)$"

should read

--$V_{Cx} = \frac{1}{Cx} \int \Delta(i_1(t_1 + t_2) - \frac{V_{Cx}}{R_{x2}} \cdot t_2)$--.

UNITED STATES PATENT AND TRADEMARK OFFICE
CERTIFICATE OF CORRECTION

PATENT NO.  : 5,414,862
DATED       : May 9, 1995
INVENTOR(S) : Koji Suzuki, et al.

It is certified that error appears in the above-identified patent and that said Letters Patent is hereby corrected as shown below:

COLUMN 17

Line 48, "resulting" should read --resulting in--.

Signed and Sealed this

Twenty-fifth Day of July, 1995

Attest:

BRUCE LEHMAN

Attesting Officer       Commissioner of Patents and Trademarks